United States Patent
Kobayashi et al.

(10) Patent No.: US 10,967,554 B2
(45) Date of Patent: Apr. 6, 2021

(54) EXTRUDER SCREW HAVING PATHS WITHIN THE SCREW, EXTRUDER, AND EXTRUSION METHOD

(71) Applicants: Toshiba Kikai Kabushiki Kaisha, Tokyo (JP); HSP Technologies Inc., Ibaraki (JP)

(72) Inventors: Akiyoshi Kobayashi, Fuji (JP); Shigeyuki Fujii, Numazu (JP); Takafumi Sameshima, Mishima (JP); Hiroshi Shimizu, Tsukuba (JP)

(73) Assignees: Toshiba Kikai Kabushiki Kaisha, Tokyo (JP); HSP TECHNOLOGIES INC., Ibaraki (JP)

( * ) Notice: Subject to any disclaimer, the term of this patent is extended or adjusted under 35 U.S.C. 154(b) by 1032 days.

(21) Appl. No.: 15/345,750

(22) Filed: Nov. 8, 2016

(65) Prior Publication Data
US 2017/0113394 A1 Apr. 27, 2017

Related U.S. Application Data

(63) Continuation of application No. PCT/JP2015/061874, filed on Apr. 17, 2015.

(30) Foreign Application Priority Data

May 8, 2014 (JP) .................................. 2014-096799
Apr. 14, 2015 (JP) .................................. 2015-082775

(51) Int. Cl.
*B29C 48/51* (2019.01)
*B29C 48/67* (2019.01)
(Continued)

(52) U.S. Cl.
CPC .............. *B29C 48/51* (2019.02); *B29B 7/426* (2013.01); *B29B 7/429* (2013.01); *B29B 7/483* (2013.01);
(Continued)

(58) Field of Classification Search
CPC ........... B29B 7/489; B29B 7/847; B29B 7/82; B29B 7/90; B29B 7/845; B29B 7/42;
(Continued)

(56) References Cited

U.S. PATENT DOCUMENTS 3,371,379 A * 3/1968 Reifenhauser ........ B29C 48/766
96/196
3,503,944 A * 3/1970 Mohr ...................... B29C 48/72
526/88
(Continued)

FOREIGN PATENT DOCUMENTS

| CN | 87102748 | 11/1987 |
|---|---|---|
| CN | 1382573 | 12/2002 |

(Continued)

OTHER PUBLICATIONS

Chinese Office Action issued in CN 2015-80023951.3 dated Mar. 30, 2018.
(Continued)

*Primary Examiner* — Charles Cooley
(74) *Attorney, Agent, or Firm* — DLA Piper LLP US

(57) ABSTRACT

An extruder screw includes a screw main body, conveyance portions, barrier portions, and paths. The raw materials, the conveyance of which is limited by the barrier portions, flow in from the entrance. The raw materials flowing in from the entrance flow through the paths in an opposite direction to a conveyance direction of the conveyance portions. The exit is opened in the outer circumferential surface of the screw main body at a position on an upstream side in the conveyance direction in the conveyance portions in which the entrance is opened.

14 Claims, 15 Drawing Sheets

(51) Int. Cl.
| | | |
|---|---|---|
| *B29B 7/48* | (2006.01) | |
| *B29B 7/42* | (2006.01) | |
| *B29B 7/74* | (2006.01) | |
| *B29B 7/84* | (2006.01) | |
| *B29B 7/82* | (2006.01) | |
| *B29C 48/57* | (2019.01) | |
| *B29C 48/25* | (2019.01) | |
| *B29C 48/54* | (2019.01) | |
| *B29C 48/80* | (2019.01) | |
| *B29C 48/72* | (2019.01) | |
| *B29C 48/76* | (2019.01) | |
| *B29C 48/55* | (2019.01) | |
| *B29C 48/40* | (2019.01) | |
| *B29C 48/03* | (2019.01) | |
| *B29C 48/385* | (2019.01) | |
| *B29K 33/00* | (2006.01) | |
| *B29K 69/00* | (2006.01) | |

(52) U.S. Cl.
CPC .............. *B29B 7/484* (2013.01); *B29B 7/487* (2013.01); *B29B 7/489* (2013.01); *B29B 7/7461* (2013.01); *B29B 7/7485* (2013.01); *B29B 7/845* (2013.01); *B29C 48/67* (2019.02); *B29B 7/82* (2013.01); *B29C 48/03* (2019.02); *B29C 48/2564* (2019.02); *B29C 48/2565* (2019.02); *B29C 48/385* (2019.02); *B29C 48/402* (2019.02); *B29C 48/54* (2019.02); *B29C 48/55* (2019.02); *B29C 48/57* (2019.02); *B29C 48/725* (2019.02); *B29C 48/763* (2019.02); *B29C 48/767* (2019.02); *B29C 48/83* (2019.02); *B29K 2033/12* (2013.01); *B29K 2069/00* (2013.01)

(58) Field of Classification Search
CPC ....... B29B 7/421; B29B 7/823; B29B 7/7485; B29B 7/7461; B29B 7/429; B29B 7/482; B29B 7/422; B29B 7/726; B29C 47/402; B29C 47/6018; B29C 47/622; B29C 47/6056; B29C 47/6012; B29C 48/82; B29C 48/802; B29C 48/625; B29C 48/385; B29C 48/535; B29C 48/55; B29C 48/54; B29C 48/72; B29C 48/402; B29C 48/74; B29C 48/745; B29C 48/725; B29C 48/51; B29C 48/515; B29K 2105/251; B29K 2023/12; B29K 2509/00
USPC ................................. 425/200–209; 366/79–91
See application file for complete search history.

(56) References Cited

U.S. PATENT DOCUMENTS

| | | | | |
|---|---|---|---|---|
| 3,712,594 | A * | 1/1973 | Schippers | B29C 47/60 159/2.2 |
| 3,746,318 | A * | 7/1973 | Schippers | B29B 7/42 366/79 |
| 3,799,234 | A | 3/1974 | Skidmore | |
| 3,924,842 | A * | 12/1975 | Klein | B29C 48/395 366/79 |
| 3,963,558 | A | 6/1976 | Skidmore | |
| 3,999,921 | A | 12/1976 | Thor et al. | |
| 4,169,679 | A | 10/1979 | Miller et al. | |
| 4,290,702 | A * | 9/1981 | Klein | B29C 45/50 366/293 |
| 4,302,409 | A | 11/1981 | Miller et al. | |
| 4,329,313 | A | 5/1982 | Miller et al. | |
| 4,387,997 | A * | 6/1983 | Klein | B29C 45/50 366/295 |
| 4,423,960 | A | 1/1984 | Anders | |
| 4,472,059 | A * | 9/1984 | Klein | B29C 47/38 366/293 |
| 4,637,790 | A * | 1/1987 | Klein | B29C 47/6006 366/293 |
| 4,802,140 | A * | 1/1989 | Dowling | B29B 7/42 366/79 |
| 4,902,455 | A | 2/1990 | Wobbe | |
| 4,959,186 | A | 9/1990 | Dollhopf et al. | |
| 4,983,114 | A | 1/1991 | Hauck | |
| 5,102,594 | A | 4/1992 | Burlet | |
| 5,358,681 | A | 10/1994 | Jerman et al. | |
| 5,499,870 | A | 3/1996 | Rockstedt | |
| 5,804,111 | A | 9/1998 | Kobayashi et al. | |
| 6,024,479 | A | 2/2000 | Haring | |
| 8,048,948 | B2 * | 11/2011 | Shimizu | B29B 7/90 524/442 |
| 8,975,336 | B2 * | 3/2015 | Shimizu | B29B 7/125 525/185 |
| 9,199,393 | B2 * | 12/2015 | Shimizu | B29B 7/14 |
| 2002/0186612 | A1 | 12/2002 | Murakami et al. | |
| 2004/0222543 | A1 | 11/2004 | Innerebner et al. | |
| 2004/0238990 | A1 | 12/2004 | Hermann et al. | |
| 2005/0087904 | A1 | 4/2005 | Bryan | |
| 2006/0108706 | A1 | 5/2006 | Galimberti et al. | |
| 2016/0303766 | A1 * | 10/2016 | Kobayashi | C08L 69/00 |
| 2016/0332331 | A1 * | 11/2016 | Kobayashi | B29C 48/395 |
| 2016/0332332 | A1 * | 11/2016 | Kobayashi | B29B 7/42 |
| 2017/0021547 | A1 * | 1/2017 | Kobayashi | B29B 7/426 |
| 2017/0050366 | A1 * | 2/2017 | Kobayashi | B29C 48/385 |
| 2017/0050367 | A1 * | 2/2017 | Kobayashi | B29B 7/489 |
| 2017/0113394 | A1 * | 4/2017 | Kobayashi | B29C 47/64 |
| 2017/0225360 | A1 * | 8/2017 | Kobayashi | B29C 48/76 |
| 2017/0225379 | A1 * | 8/2017 | Kobayashi | B29C 48/505 |
| 2018/0093233 | A1 * | 4/2018 | Kobayashi | B29B 7/421 |
| 2018/0093234 | A1 * | 4/2018 | Kobayashi | B29B 7/42 |
| 2019/0352472 | A1 * | 11/2019 | Sameshima | C08K 3/04 |
| 2020/0282622 | A1 | 9/2020 | Ougier | |

FOREIGN PATENT DOCUMENTS

| | | |
|---|---|---|
| CN | 101973121 | 2/2011 |
| CN | 103068540 | 4/2013 |
| DE | 2040919 A | 2/1972 |
| DE | 2454785 A | 5/1976 |
| DE | 25 48 490 | 5/1977 |
| DE | 69417466 | 12/1999 |
| EP | 0 688 600 | 12/1995 |
| EP | 2 578 378 | 4/2013 |
| GB | 1175127 | 12/1969 |
| GB | 1 501 412 | 2/1978 |
| JP | 48-61153 | 8/1973 |
| JP | S50-143863 | 11/1975 |
| JP | S52-72573 | 5/1977 |
| JP | 56-037054 | 8/1981 |
| JP | S57-034936 | 2/1982 |
| JP | S57-41932 | 3/1982 |
| JP | 57-107826 | 7/1982 |
| JP | S57-163547 | 10/1982 |
| JP | S58-025943 | 2/1983 |
| JP | 59-184635 | 10/1984 |
| JP | H01-320129 | 12/1989 |
| JP | 5-220818 | 8/1993 |
| JP | H06-170920 | 6/1994 |
| JP | 07-088923 | 4/1995 |
| JP | 07-227836 | 8/1995 |
| JP | H09-504755 | 5/1997 |
| JP | 2002-321214 | 11/2002 |
| JP | 2004-529018 | 9/2004 |
| JP | 2005-169764 | 6/2005 |
| JP | 2008-302555 | 12/2008 |
| JP | 2009-045804 | 3/2009 |
| JP | 2010-069771 | 4/2010 |
| JP | 2010-105285 | 5/2010 |
| JP | 2010-137405 | 6/2010 |
| JP | 2011-020341 | 2/2011 |
| JP | 2011-046104 | 3/2011 |
| JP | 2011-083976 | 4/2011 |
| JP | 2011-116025 | 6/2011 |

(56) References Cited

FOREIGN PATENT DOCUMENTS

| | | |
|---|---|---|
| JP | 2012-051289 | 3/2012 |
| JP | 2013-071428 | 4/2013 |
| JP | 2013-123841 | 6/2013 |
| JP | 53-69614 | 12/2013 |
| JP | 2014-019045 | 2/2014 |
| KR | 2002-0082788 | 10/2002 |
| KR | 10-0401578 | 8/2004 |
| KR | 10-2010-0087738 | 8/2010 |
| SU | 889462 | 12/1981 |
| WO | WO 2020-025446 | 2/1920 |
| WO | WO 2010/061872 | 6/2010 |
| WO | WO 2012/029271 | 3/2012 |
| WO | WO 2013-133453 | 9/2013 |
| WO | WO 2015/163197 | 10/2015 |
| WO | WO 2015/170617 | 11/2015 |
| WO | WO-2020025446 A1 * | 2/2020 ............. B29C 48/51 |

OTHER PUBLICATIONS

Chinese Office Action issued in CN 2015-80024101.5 dated Apr. 2, 2018.
Xiaozheng, Geng "Plastics Mixing & Continuous Mixing Equipment", China Light Industry Press, pp. 349-353, Jan. 31, 2008.
International Search Report (with English Translation) issued in PCT/JP2015/061874 dated Jul. 7, 2015.
Written Opinion (with English Translation) issued in PCT/JP2015/061874 dated Jul. 7, 2015.
International Preliminary Report on Patentability issued in PCT/JP2015/061874 dated Nov. 8, 2016.
International Search Report (with English Translation) issued in PCT/JP2015/062549 dated Jul. 21, 2015.
Written Opinion (with English Translation) issued in PCT/JP2015/062549 dated Jul. 21, 2015.
International Preliminary Report on Patentability issued in PCT/JP2015/062549 dated Nov. 8, 2016.
International Search Report (with English Translation) issued in PCT/JP2015/062566 dated Jul. 21, 2015.
Written Opinion (with English Translation) issued in PCT/JP2015/062566 dated Jul. 21, 2015.
International Preliminary Report on Patentability issued in PCT/JP2015/062566 dated Nov. 8, 2016.
English Language Translation and Abstract of WO 2012/029271 Mar. 8, 2012.
English Language Translation and Abstract of JP 2010-105285 May 13, 2010.
English Language Translation and Abstract of JP S50-143863 published Nov. 19, 1975.
English Language Translation and Abstract of JP 2009-45804 published Mar. 5, 2009.
English Language Translation and Abstract of JP 2002-321214 published Nov. 5, 2002.
English Language Abstract of JP H09-504755 published May 13, 1997.
English Language Translation and Abstract of JP 48-61153 published Aug. 3, 1973.
English Language Translation and Abstract of JP H06-170920 Jun. 21, 1994.
English Language Translation and Abstract of JP 2011-116025 published Jun. 16, 2011.
English Language Translation and Abstract of JP 2004-529018 published Sep. 24, 2004.
English Language Translation and Abstract of JP H01-320129 published Dec. 26, 1989.
Korean Office Action issued in KR 2016-7033993 dated Aug. 2, 2018.
Taiwanese Office Action (with English Translation) issued in TW 104114405 dated Jun. 16, 2016.
Taiwanese Office Action (with English Translation) issued in TW 104114406 dated Jun. 16, 2016.
English Language Abstract of JP S57-034936 published Feb. 25, 1982.
English Language Abstract of JP 2008-302555 published Dec. 18, 2008.
English Language Abstract of JP 2011-083976 published Apr. 28, 2011.
English Language Abstract of JP 07-227836 published Aug. 29, 1995.
English Language Abstract of JP 2010-137405 published Jun. 24, 2010.
English Language Abstract of JP 2013-123841 published Jun. 24, 2013.
English Language Abstract of JP 2011-020341 published Feb. 3, 2011.
Japanese Office Action issued in JP Application No. 2015-082775 dated May 7, 2019.
Chinese Office Action (with English Translation) issued in CN 201580005725.2 dated Apr. 24, 2017.
English Language Translation and Abstract of CN 1382573 published Dec. 4, 2002.
English Language Translation and Abstract of JP 57-163547 published Oct. 7, 1982.
Korean Office Action issued in KR 2016-7033989 dated Jul. 16, 2018.
German Office Action issued in DE Application No. 11 2015 002 161.2 dated Aug. 8, 2019.
International Search Report issued in International Application No. PCT/JP2015/060641 dated May 26, 2015.
International Search Report issued in International Application No. PCT/JP2015/061487 dated Jul. 7, 2015.
International Search Report issued in International Application No. PCT/JP2016/062278 dated Jul. 12, 2016.
International Search Report issued in International Application No. PCT/JP2016/062279 dated Jul. 12, 2016.
Written Opinion issued in International Application No. PCT/JP2015/060641 dated May 26, 2015.
Written Opinion issued in International Application No. PCT/JP2015/061487 dated Jul. 7, 2015.
Written Opinion issued in International Application No. PCT/JP2016/062278 dated Jul. 12, 2016.
Written Opinion issued in International Application No. PCT/JP2016/062279 dated Jul. 12, 2016.
Taiwan Office Action issued in Taiwan Application No. 104112230 dated Sep. 2, 2016.
Taiwan Office Action issued in Taiwan Application No. 104112709 dated Sep. 2, 2016.
Chinese Office Action issued in Chinese Application No. 201580007088.2 dated Mar. 3, 2017.
Chinese Office Action issued in Chinese Application No. 201580007825.9 dated Mar. 24, 2017.
Korean Office Action issued in KR 10-2016-7021148 dated Nov. 29, 2017.
English Language Abstract of JP 7-227836 published Aug. 29, 1995.
English Language Abstract of JP 2005-169764 published Jun. 30, 2005.
English Language Abstract of JP 57-041932 published Mar. 9, 1982.
English Language Abstract of KR 10-2010-0087738 published Aug. 5, 2010.
Office Action in CN Application No. 201680024052X dated Jul. 22, 2019.
Office Action in DE Application No. 112015001938.3 dated Jul. 26, 2019.
Korean Office Action issued in KR 10-2016-7019779 dated Nov. 27, 2017.
English Language Abstract of KR 2002-0082788 published Oct. 31, 2002.
U.S. Appl. No. 15/221,293.
U.S. Appl. No. 15/795,534.
U.S. Appl. No. 15/795,535.
U.S. Appl. No. 15/345,711.
U.S. Appl. No. 15/345,758.

(56) References Cited

OTHER PUBLICATIONS

German Office Action in DE Application No. 11 2015 002 164.7, dated Jun. 23, 2020.
U.S. Appl. No. 15/221,277.
Partial Image File Wrapper for U.S. Appl. No. 15/345,711 filed Nov. 8, 2015 electronically captured from PAIR on Dec. 11, 2020 (Sep. 18, 2020 to Present).
Partial Image File Wrapper for U.S. Appl. No. 15/221,293, filed Jul. 27, 2016 electronically captured from PAIR on Feb. 24, 2021 (Dec. 23. 2020 to Present).
Partial Image File Wrapper for U.S. Appl. No. 15/221,277, filed Jul. 27, 2016 electronically captured from PAIR on Feb. 24, 2021 (Dec. 23, 2020 to Present).
Partial Image File Wrapper for U.S. Appl. No. 15/795,534, filed Oct. 27, 2017 electronically captured from PAIR on Feb. 24, 2021 (Dec. 23, 2020 to Present).
Partial Image File Wrapper for U.S. Appl. No. 15/795,535, filed Oct. 27, 2017 electronically captured from PAIR on Feb. 24, 2021 (Dec. 23, 2020 to Present).
Partial Image File Wrapper for U.S. Appl. No. 15/345,758, filed Nov. 8, 2016 electronically captured from PAIR on Feb. 24, 2021 (Dec. 23, 2020 to Present).
Image File Wrapper for U.S. Appl. No. 17/166,781, filed Feb. 3, 2021 electronically captured from PAIR on Feb. 24, 2021 (Dec. 23, 2020 to Present).

\* cited by examiner

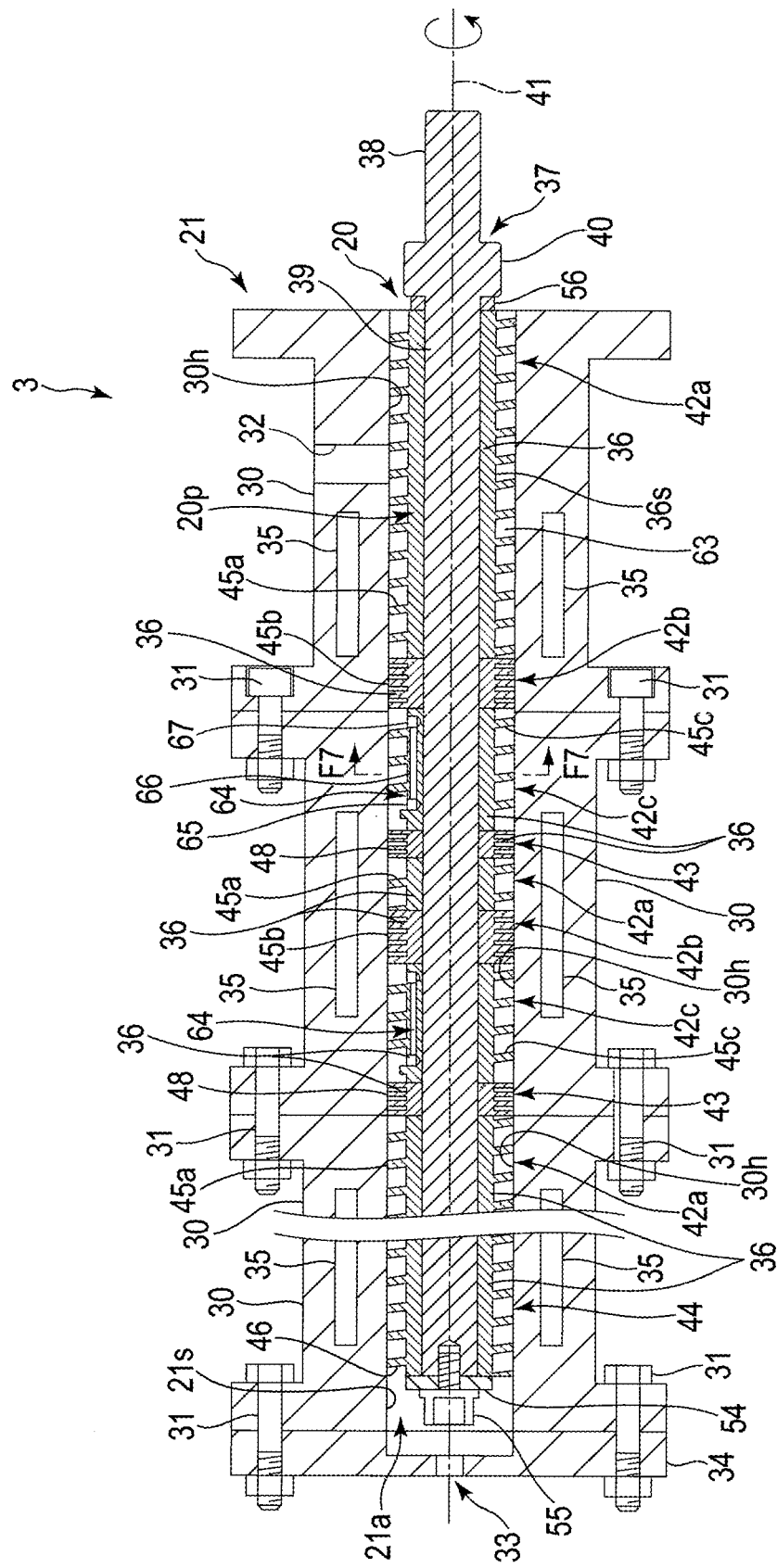
F I G. 6

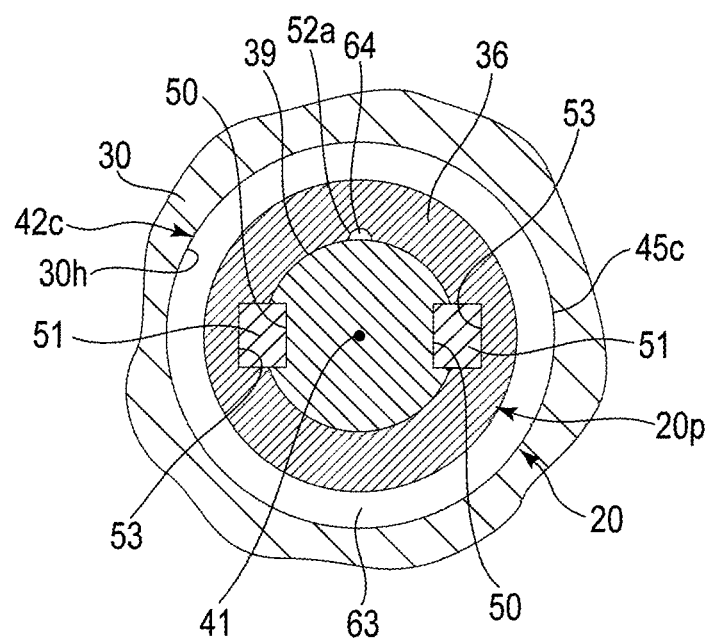
F I G. 16
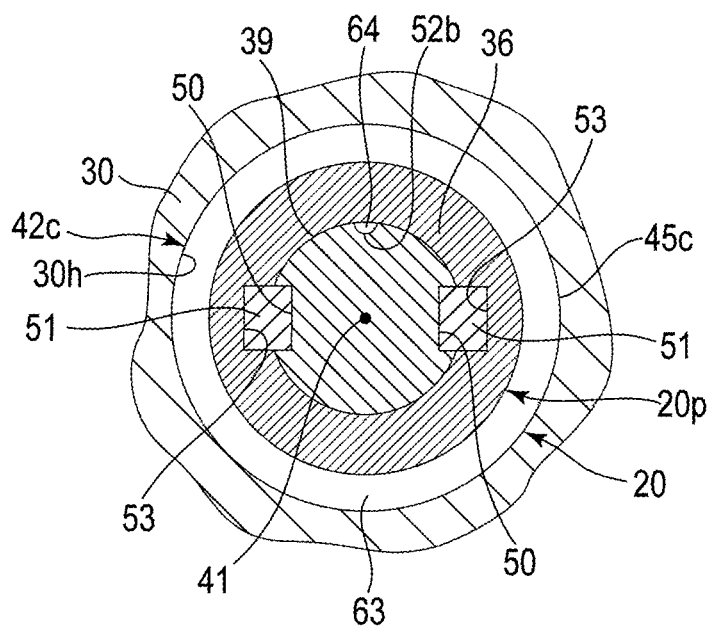
F I G. 17

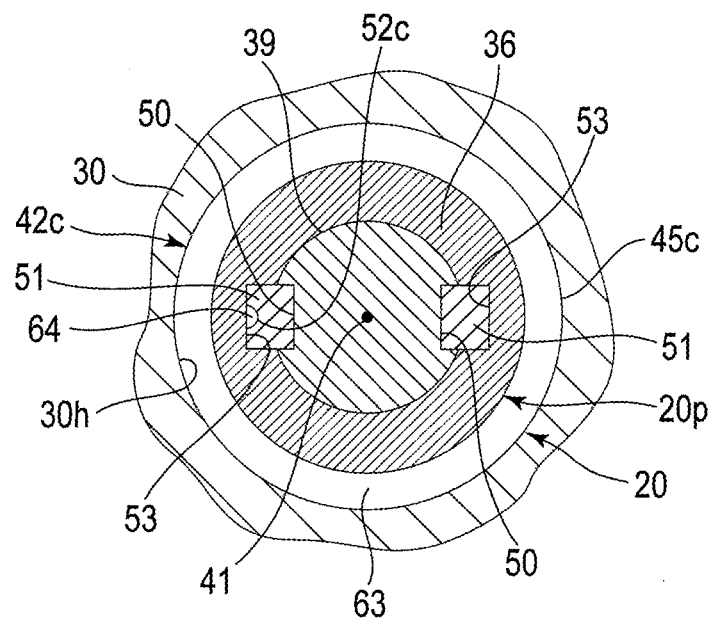
F I G. 18
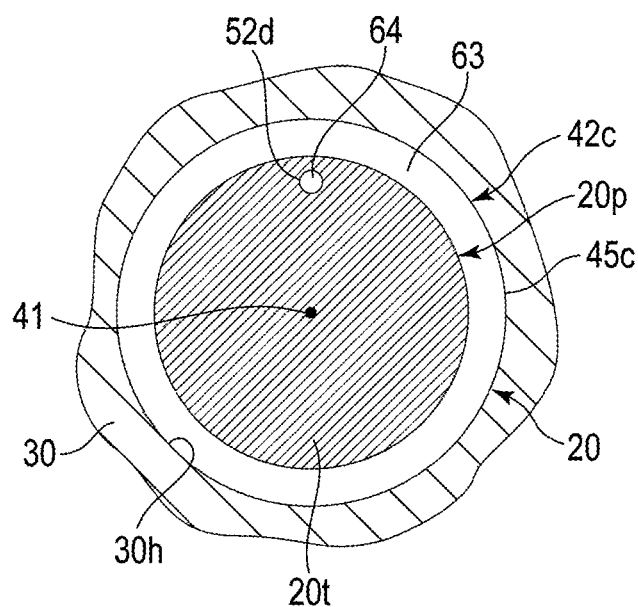
F I G. 19

EXTRUDER SCREW HAVING PATHS WITHIN THE SCREW, EXTRUDER, AND EXTRUSION METHOD

CROSS REFERENCE TO RELATED APPLICATIONS

This application is a Continuation Application of PCT Application No. PCT/JP2015/061874, filed Apr. 17, 2015 and based upon and claiming the benefit of priority from prior Japanese Patent Applications No. 2014-096799, filed May 8, 2014; and No. 2015-082775, filed Apr. 14, 2015, the entire contents of all of which are incorporated herein by reference.

BACKGROUND OF THE INVENTION

1. Field of the Invention

The present invention relates to an extruder screw, an extruder, and an extrusion method for producing kneaded materials by kneading continuously supplied raw materials, and continuously extruding the kneaded materials.

2. Description of the Related Art

As a technique of kneading raw materials, Patent Literature 1 discloses a batch kneading apparatus capable of dispersing raw materials at a nanolevel and kneading them without using additives. The batch kneading apparatus comprises a feedback-type screw and a cylinder in which the screw is rotatably inserted. The kneading apparatus repeats a circulation process of feeding raw materials supplied to the cylinder from a rear end of the screw to a gap in a front end, and then, returning them from the gap to the rear end of the screw.

In the circulation process, "shearing action", caused by a difference in speed between the rotating screw and an inner surface of the cylinder, is imparted to the raw materials while they are being fed from the rear end to the front end of the screw; and "extension action", caused when they pass from a wide place to a narrow place, is imparted to them while they are being fed from the gap in the front end of the screw along a hole of the screw.

At this time, in the cylinder, the raw materials are in a state of repeating a shearing flow and an extension flow. Predetermined kneaded materials are produced in accordance with a time for which a shearing flow and an extension flow are repeated, that is, a circulation time.

CITATION LIST

Patent Literature

Patent Literature 1
WO 2010/061872 A1

BRIEF SUMMARY OF THE INVENTION

Technical Problem

Incidentally, the apparatus according to Patent Literature 1 cannot perform the next kneading unless a particular amount of raw materials has been kneaded in the cylinder and all the kneaded materials have been discharged from the cylinder. In other words, kneaded materials cannot be continuously discharged from the cylinder while the raw materials are being circulated in an enclosed space in the cylinder. Therefore, there has been a certain limit on improvements in the productivity of kneaded materials.

In this case, the same amount of kneaded materials as in the case where kneaded materials are continuously produced can be apparently obtained by preparing a plurality of apparatuses identical to that of Patent Literature 1 and staggering the times when they perform a circulation process. However, additional costs become necessary to invest in facilities for the plurality of kneading apparatuses and secure a space for installation, etc. As a result, the productivity of kneaded materials cannot be maintained or improved.

Therefore, an object of the present invention is to provide an extrusion technique of enabling kneaded materials to be continuously discharged from a cylinder, thereby significantly improving the productivity of the kneaded materials.

Moreover, to obtain kneaded materials dispersed at a nanolevel, it is required that the degree of kneading of raw materials be improved. Such a requirement can be fulfilled by increasing the number of times shearing action and extension action are imparted to raw materials. The number of times shearing action and extension action are imparted can be increased by, for example, providing portions which impart shearing action and portions which impart extension action along an axial direction of a screw. However, in such a structure, the screw is elongated.

Moreover, the degree of kneading of raw materials can be set in advance on the basis of the above-described number of times shearing action and extension action are imparted. However, in the apparatus of Patent Literature 1, the number of times raw materials circulates in the cylinder cannot be counted. Thus, the above-described number of times shearing action and extension action are imparted cannot be set in advance.

Therefore, another object of the present invention is to provide an extrusion technique of enabling the number of times shearing action and extension action are imparted to raw materials to be set in advance, thereby significantly improving the degree of kneading of the raw materials without elongating a screw.

Solution to Problem

In general, according to one embodiment, an extruder screw includes a screw main body, conveyance portions, barrier portions, and paths. The raw materials, the conveyance of which is limited by the barrier portions, flow in from the entrance. The raw materials flowing in from the entrance flow through the paths in an opposite direction to a conveyance direction of the conveyance portions. The exit is opened in the outer circumferential surface of the screw main body at a position on an upstream side in the conveyance direction in the conveyance portions in which the entrance is opened.

Advantageous Effects of Invention

According to the present invention, the productivity of kneaded materials can be significantly improved by enabling the kneaded materials to be continuously discharged from a cylinder.

According to the present invention, the degree of kneading of raw materials can be significantly improved without elongating a screw by enabling the number of times shearing action and extension action are imparted to the raw materials to be set in advance.

According to the present invention, the structure in which raw materials conveyed by conveyance portions are made to flow through paths by barrier portions, and are thereby circulated from the conveyance portions through the paths can be achieved. By disposing and forming the circulation structure in an axial direction of a screw, the raw materials can be circulated at an arbitrary position and within an arbitrary range in the axial direction of the screw, and shearing action and extension action can be alternately imparted to the raw materials.

Moreover, some of the raw materials circulated by the circulation structure are extruded over the barrier portions, and the raw materials do not flow back. Thus, kneaded materials can be continuously produced. Furthermore, according to the circulation structure, the number of times shearing action and extension action are imparted to the raw materials and the time for which shearing action and extension action are imparted to the raw materials can be increased without elongating the extruder screw.

BRIEF DESCRIPTION OF THE SEVERAL VIEWS OF THE DRAWING

FIG. 6 is a transverse sectional view of the second extruder showing an internal structure of the extruder screw.

FIG. 16 is a longitudinal sectional view schematically showing the structure of the extruder screw in which paths are provided along an inner circumferential surface of a tube in a modification of the present invention.

FIG. 17 is a longitudinal sectional view schematically showing the structure of the extruder screw in which the paths are provided along an outer circumferential surface of an axis of rotation in a modification of the present invention.

FIG. 18 is a longitudinal sectional view schematically showing the structure of the extruder screw in which the paths are provided along surfaces of keys in a modification of the present invention.

FIG. 19 is a longitudinal sectional view schematically showing the structure of the extruder screw in which a screw main body is formed of one axial member in a modification of the present invention.

FIG. 20 (B) is a sectional view along line F20B-F20B of FIG. 20 (A).

FIG. 21 (B) is a sectional view along line F21B-F21B of FIG. 21 (A).

FIG. 22 (B) is a sectional view along line F22B-F22B of FIG. 22 (A).

FIG. 23 (B) is a sectional view along line F23B-F23B of FIG. 23 (A).

FIG. 24 (B) is a sectional view along line F24B-F24B of FIG. 24 (A).

FIG. 25 (B) is a sectional view along line F25B-F25B of FIG. 25 (A).

DETAILED DESCRIPTION OF THE INVENTION

One of the embodiments of the present invention will be described hereinafter with reference to the accompanying drawings.

Figure 1:
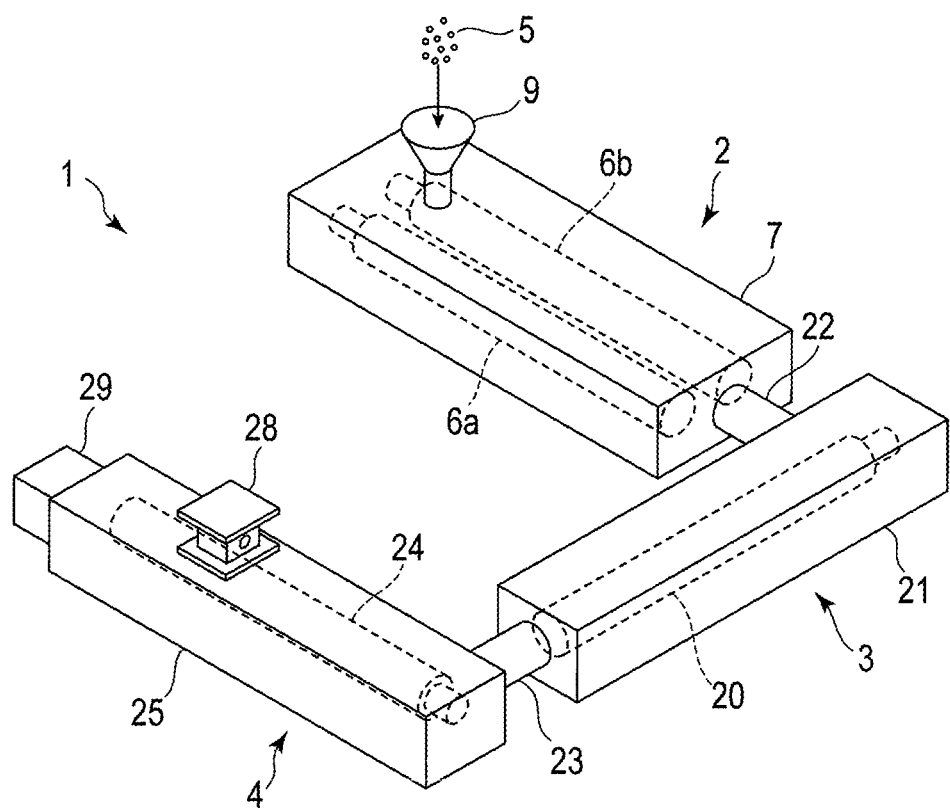
FIG. 1 is a perspective view schematically showing a whole structure of a continuous high shearing processing apparatus according to one of the embodiments of the present invention.

FIG. 1 shows a structure of a continuous high shearing processing apparatus 1 according to the present embodiment. The high shearing processing apparatus 1 is formed by connecting a first extruder 2, a second extruder 3, and a third extruder 4 in series. The third extruder 4 is not absolutely necessary, and is incorporated into the continuous high shearing processing apparatus 1 depending on purposes.

The first extruder 2 melts materials 5 by preliminarily kneading them, and continuously supplies the thereby produced materials 5 in a melted state to the second extruder 3 as raw materials. The second extruder 3 imparts shearing action and extension action to the raw materials continuously supplied from the first extruder 2, and continuously extrudes the kneaded materials. The third extruder 4 draws and removes gaseous components included in the kneaded materials extruded from the second extruder 3, and discharges the kneaded materials, from which the gaseous components are drawn and removed, to the outside.

As the raw materials kneaded by the second extruder 3, not only melted and mixed raw materials of a polycarbonate (PC) resin and a polymethyl methacrylate (PMMA) resin, but also various raw materials such as raw materials of a thermoplastic resin in a melted state including carbon fibers, are applied.

[First Extruder 2]

Figure 2:
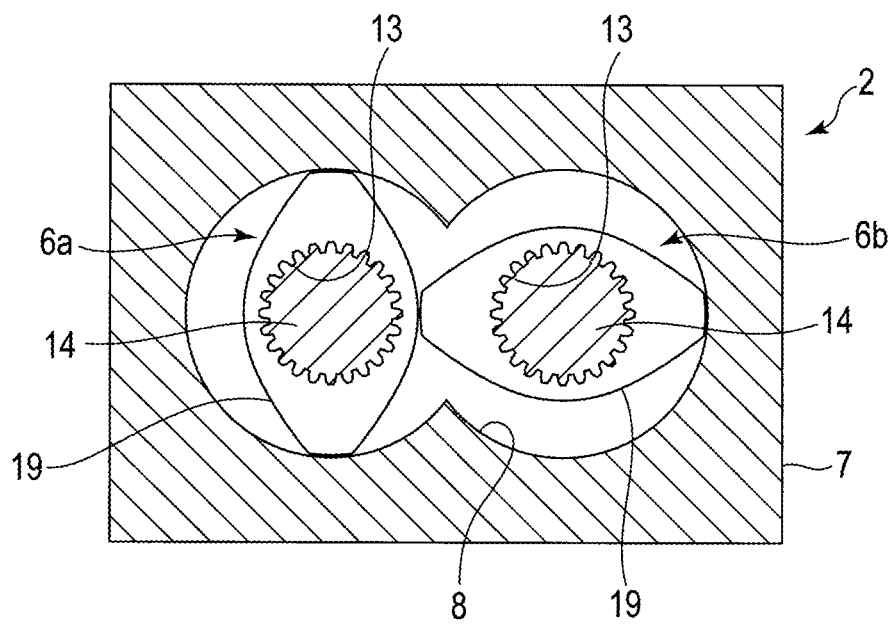
FIG. 2 is a longitudinal sectional view of a first extruder.

As shown in FIG. 2, the first extruder 2 is formed as a co-rotating twin screw extruder, and comprises two screws 6a and 6b engaging with each other, and a barrel 7 in which the two screws 6a and 6b are rotatably accommodated. The two screws 6a and 6b are formed to extend parallel and straight, and can rotate in the same direction in a state of engaging with each other. The barrel 7 comprises an accommodation portion 8 in which the two screws 6a and 6b in a state of engaging with each other are rotatably accommodated, and a heater (not shown in the figures) for heating and melting the materials 5 introduced from an introduction portion 9 (see FIG. 1) into the accommodation portion 8.

Figure 3:
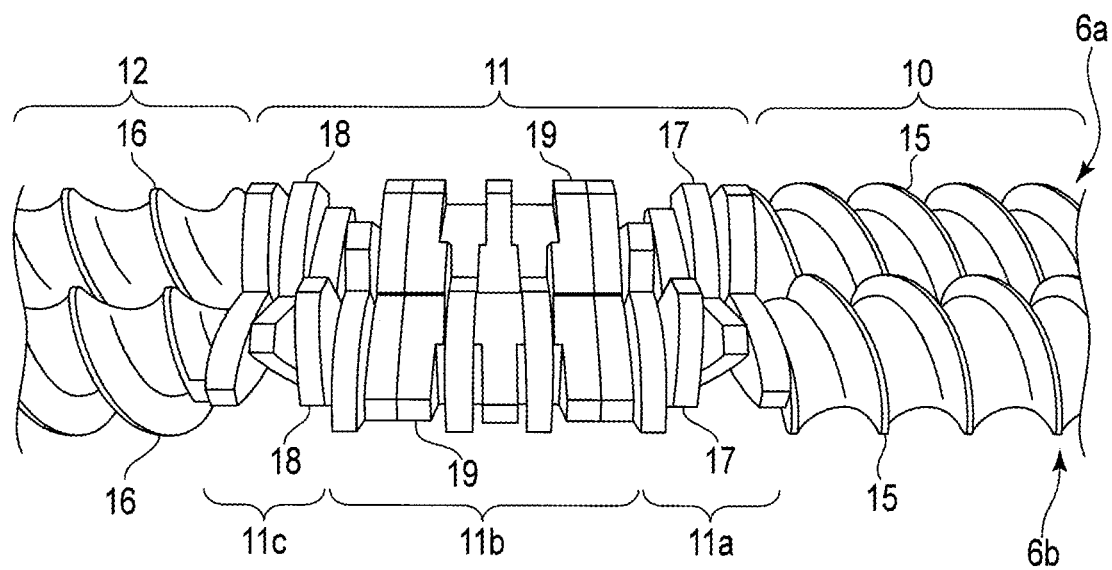
FIG. 3 is a perspective view schematically showing a structure of two screws incorporated in the first extruder.

As shown in FIG. 3, the two screws 6a and 6b can preliminarily knead the introduced materials 5 (see FIG. 1) while conveying them by rotating in the same direction in a state of engaging with each other. The two screws 6a and 6b in a state of engaging with each other comprise a feed portion 10, a kneading portion 11, and a pumping portion 12.

Spline holes 13 are formed in the central portions of the feed portion 10, the kneading portion 11, and the pumping portion 12. In the spline holes 13, spline axes 14 coupled to a rotating device (not shown in the figures), for example, a motor, are inserted. The feed portion 10, the kneading portion 11, and the pumping portion 12 can be rotated by rotating the spline axes 14. FIG. 2 shows the spline holes 13 formed in disks 19 of the kneading portion 11 of the two screws 6a and 6b as an example of the spline holes 13.

According to this structure, by rotating the two screws 6a and 6b in the same direction, the materials 5 introduced from the introduction portion 9 into the accommodation portion 8 are conveyed by the feed portion 10 and kneaded by the kneading portion 11, and then, conveyed by the pumping portion 12 and continuously supplied to the second extruder 3.

In the feed portion 10, the two screws 6a and 6b are each provided with a flight 15 which is spirally twisted in the opposite direction to the rotation direction of the screws 6a and 6b in the conveyance direction of the materials 5. The respective flights 15 engage with each other in a state of being out of phase by 90°. By rotating the two screws 6a and 6b in this state, the introduced materials 5 can be conveyed to the kneading portion 11.

In the pumping portion 12, the two screws 6a and 6b are each provided with a flight 16 which is spirally twisted in the opposite direction to the rotation direction of the screws 6a and 6b in the conveyance direction of the materials 5. The respective flights 16 engage with each other in a state of being out of phase by 90°. By rotating the two screws 6a and 6b in this state, the materials 5 kneaded by the kneading portion 11 can be conveyed.

In the kneading portion 11, the two screws 6a and 6b are each provided with a first disk area 11a, a second disk area 11b, and a third disk area 11c. The first disk area 11a is provided with disks 17, and the disks 17 are formed by making the adjacent disks 17 differ in phase in conformity with the spiral direction of the flights 15 of the feed portion 10. Similarly, the third disk area 11c is provided with disks 18, and the disks 18 are formed by making the adjacent disks 18 differ in phase in conformity with the spiral direction of the flights 16 of the pumping portion 12. In contrast, the second disk area 11b is provided with disks 19, and the disks 19 are formed by orthogonalizing the adjacent disks 19.

According to the above-described first extruder 2, by mixing the materials 5 introduced from the introduction portion 9 into the accommodation portion 8 while melting them by heating, the materials 5 can be produced as raw materials having flowability suitable to be kneaded by the second extruder 3. The melted and mixed raw materials are continuously extruded from the first extruder 2.

[Second Extruder 3]

As shown in FIG. 1, the second extruder 3 is formed as a single screw extruder, and comprises an extruder screw 20 and a barrel 21 comprising a cylinder 21a (see FIG. 5 and FIG. 6) in which the screw 20 is rotatably inserted. The raw materials continuously extruded from the first extruder 2 are continuously supplied to the second extruder 3 through a path portion 22. In the second extruder 3, shearing action and extension action are imparted to the raw materials, and thus, kneaded materials are continuously produced. The produced kneaded materials are continuously supplied to the third extruder 4 through a path portion 23. A specific structure of the second extruder 3 comprising the screw 20 will be described in detail later.

[Third Extruder 4]

Figure 4:
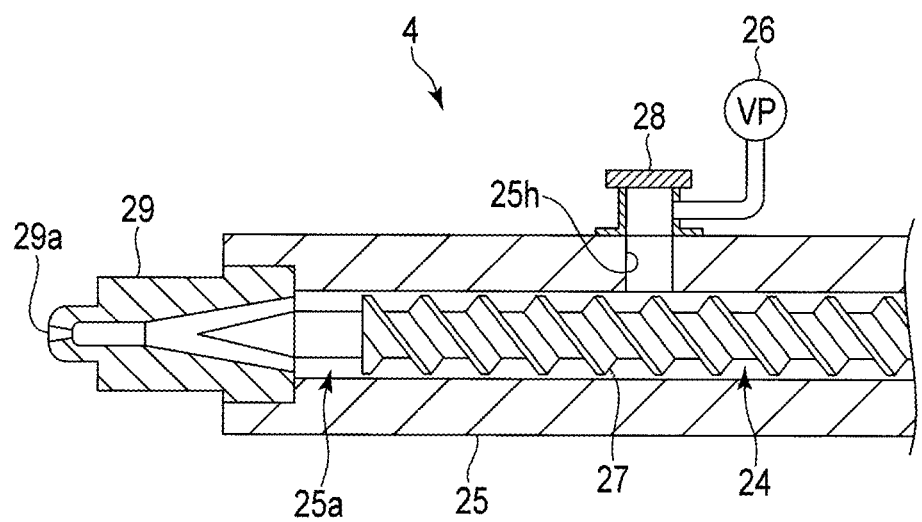
FIG. 4 is a transverse sectional view of a third extruder.

As shown in FIG. 4, the third extruder 4 is formed as a single screw extruder, and comprises a vented screw 24 extending straight, a barrel 25 comprising an accommodation portion 25a in which the vented screw 24 is rotatably accommodated, and a vacuum pump 26 for creating negative pressure in the accommodation portion 25a.

The vented screw 24 is provided with a spiral flight 27 for conveying kneaded materials supplied from the second extruder 3 along the accommodation portion 25a. The flight 27 is twisted from the basal end toward the tip of the vented screw 24 in the opposite direction to the rotation direction of the vented screw 24. The vented screw 24 is coupled to a rotating device (not shown in the figures), for example, a motor. The kneaded materials supplied from the second extruder 3 are thereby continuously conveyed through the accommodation portion 25a with the rotation of the vented screw 24.

Moreover, the barrel 25 is provided with a vent-port 28 to which the vacuum pump 26 is coupled. The vent-port 28 is coupled to a communicating hole 25h which penetrates the barrel 25 and communicates with the accommodation portion 25a. Furthermore, the barrel 25 is provided with a head portion 29 which closes the accommodation portion 25a at a position facing the tip of the vented screw 24, and the head portion 29 comprises a discharge port 29a for discharging kneaded materials which are already defoamed.

According to the above-described third extruder 4, the kneaded materials supplied from the second extruder 3 receive the vacuum pressure of the vacuum pump 26 at a position facing the vent-port 28, while being conveyed toward the head portion 29 in the accommodation portion 25a by the vented screw 24. Gaseous substances, other volatile components, etc., included in the kneaded materials are thereby drawn and removed. The degassed kneaded materials are discharged from the discharge port 29a of the head portion 29, and then, processed into products suitable for purposes.

Next, the specific structure of the second extruder 3 according to the present embodiment will be described.

[Outline of the Second Extruder 3]

Figure 5:
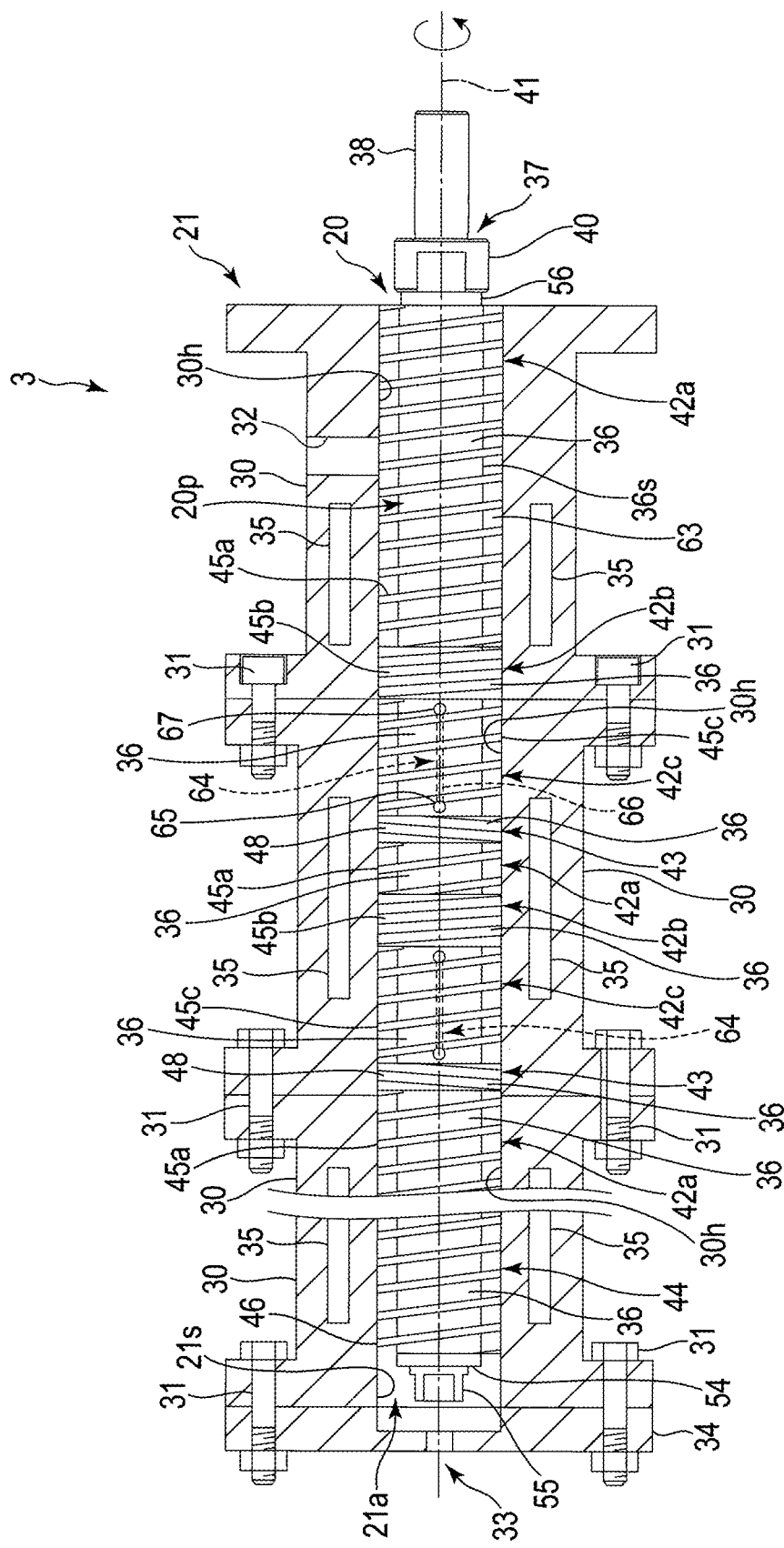
FIG. 5 is a transverse sectional view of a second extruder showing an external structure of an extruder screw.
Figure 7:
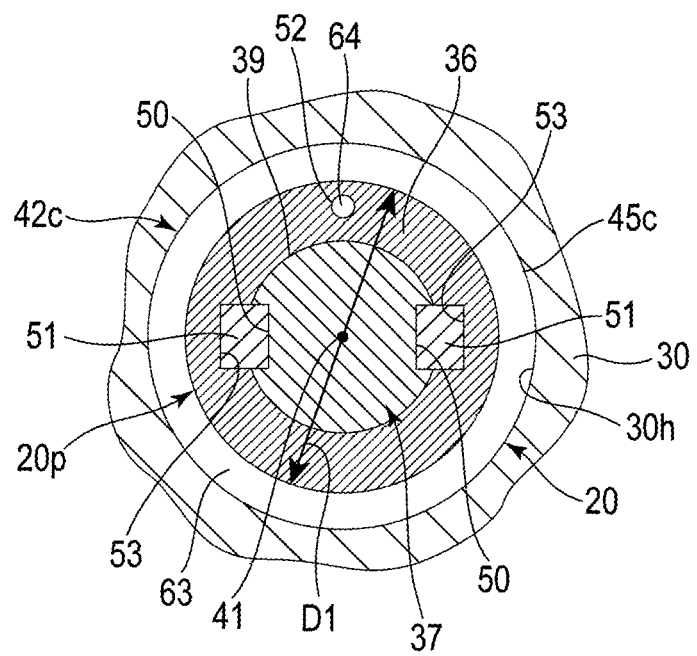
FIG. 7 is a sectional view along line F7-F7 of FIG. 6.

As shown in FIG. 5 and FIG. 6, in the second extruder 3, the barrel 21 is divided into barrel elements 30. The barrel elements 30 comprise cylindrical through-holes 30h in which the extruder screw 20 is rotatably inserted, respectively. In this case, the barrel elements 30 are integrally joined, such that the respective through-holes 30h coaxially continue, whereby the barrel 21 comprising the one continuous cylinder 21a is formed. The figures show, as an example, the barrel 21 in which the adjacent barrel elements 30 are joined to each other by bolts 31.

In a barrel element 30 located at one end of the barrel 21, a supply port 32 is provided. The supply port 32 penetrates the barrel element 30 and communicates with the cylinder 21a. Raw materials continuously supplied from the first extruder 2 through the path portion 22 are continuously supplied to the cylinder 21a through the supply port 32.

Moreover, in a barrel element 30 located at the other end of the barrel 21, a discharge port 33 is provided. The discharge port 33 is formed in a lid 34 joined to cover an opening end of the barrel element 30 at the other end. Kneaded materials kneaded in the cylinder 21a are thereby continuously extruded through the discharge port 33.

Moreover, in each of the barrel elements 30, a cooling water path 35 through which cooling water flows, a heater and a temperature sensor not shown in the figures, etc., are provided. In this case, raw materials in the cylinder 21a can be heated by turning on and off the heater to heat the barrel 21 and controlling the temperature at a temperature set in advance. At this time, if the barrel 21 exceeds the set temperature, the raw materials in the cylinder 21a can be cooled by making cooling water flow through the cooling water path 35 to cool the barrel 21 and adjusting the temperature to the temperature set in advance.

[Extruder Screw 20]

As shown in FIG. 5 to FIG. 8, the extruder screw 20 comprises a screw main body 20p. The screw main body 20p is composed of cylindrical tubes 36 and an axis of rotation 37 supporting the tubes 36. In this specification, an outer circumferential surface 36s of the screw main body 20p (the tubes 36) means an outer circumferential surface in the circumferential direction not including both end faces in the longitudinal direction of the screw main body 20p (the tubes 36).

The axis of rotation 37 extends straight from its basal end to its tip. In a state in which the extruder screw 20 is rotatably inserted in the cylinder 21a of the barrel 21, the basal end of the axis of rotation 37 is positioned on one end side of the barrel 21, on which the supply port 32 is provided, and the tip of the axis of rotation 37 is positioned on the other end side of the barrel 21, on which the discharge port 33 is provided.

From another point of view, in a state in which the extruder screw 20 is rotatably inserted in the cylinder 21a of the barrel 21, the basal end of the extruder screw 20 is positioned on the one end side of the barrel 21, on which the supply port 32 is provided, and the tip of the extruder screw 20 is positioned on the other end side of the barrel 21, on which the discharge port 33 is provided.

At the basal end of the axis of rotation 37, a coupling portion 38 and a stopper portion 40 are coaxially provided with respect to each other. The coupling portion 38 is formed, such that it can be coupled to a rotating device, for example, a motor, through a coupling not shown in the figures. The stopper portion 40 is formed to have larger contours than those of the coupling portion 38.

In an area extending from the tip of the axis of rotation 37 to an end face of the stopper portion 40, a support portion 39 (see FIG. 6) having a columnar shape is provided. The support portion 39 is formed to have smaller contours than those of the stopper portion 40. The support portion 39 coaxially extends from the end face of the stopper portion 40, and has a total length corresponding to the total length of the cylinder 21a of the barrel 21. The axis of rotation 37 rotates on a straight axial line 41 extending from its basal end to its tip, when torque from a rotating device not shown in the figures is transmitted to the coupling portion 38.

The cylindrical tubes 36 are each formed to be supported by the support portion 39 of the axis of rotation 37. As an example of this supporting structure, a pair of keys 51 is provided on the outer circumferential surface of the support portion 39. The keys 51 are fitted in a pair of groove portions 50, respectively, which is formed at positions shifted 180° in the circumferential direction along the outer circumferential surface of the support portion 39. Each of the groove portions 50 is formed by cutting out a part of the outer circumferential surface of the support portion 39 in the axial direction.

Moreover, each of the tubes 36 is formed to allow the support portion 39 to coaxially penetrate them along their inner circumferential surfaces. On the inner circumferential surfaces of the tubes 36, keyways 53 are formed at positions shifted 180° in the circumferential direction. The pair of keyways 53 is formed by cutting out a part of the inner circumferential surfaces of the tubes 36 in the axial direction.

In this case, while each of the keys 51 and a corresponding one of the keyways 53 are aligned, the support portion 39 of the axis of rotation 37 is made to penetrate along the inner circumferential surfaces of all the tubes 36. Then, a fixing screw 55 is screwed into the tip of the support portion 39 through a collar 54. At this time, all the tubes 36 are sandwiched between the tip collar 54 and a basal-end collar 56 of the stopper portion 40, and held firmly affixed to each other without any gap by the force by which they are sandwiched.

By the above-described supporting structure, all the tubes 36 are coaxially joined on the support portion 39, and thus, each of the tubes 36 and the axis of rotation 37 are integrally assembled. Because each of the tubes 36 and the axis of rotation 37 are integrally assembled, the screw main body 20p is formed as a rodlike member extending in the axial direction (longitudinal direction) from its basal end to its tip.

At this time, it becomes possible to rotate each of the tubes 36 on the axial line 41 together with the axis of rotation 37, that is, rotate the screw main body 20p on the axial line 41. Moreover, the basal end of the screw main body 20p corresponds to the basal end of the axis of rotation 37, and the tip of the screw main body 20p corresponds to the tip of the axis of rotation 37.

In such a state, each of the tubes 36 serves as a structural element that defines the outside diameter D1 (see FIG. 7) of the screw main body 20p. That is, the outside diameters D1 of the tubes 36 coaxially joined along the support portion 39 are set to be equal to each other. The outside diameter D1 of the screw main body 20p (each of the tubes 36) is defined as a diameter passing through the axial line 41, which is the center of rotation of the axis of rotation 37.

The segmental screw 20 in which the outside diameter D1 of the screw main body 20p (each of the tubes 36) is a fixed value is thereby formed. In the segmental screw 20, screw elements can be held in free order and combination along the axis of rotation 37 (that is, the support portion 39). With respect to the screw elements, for example, each of the tubes 36 on which at least parts of flights 45a, 45b, 45c, 46, and 48, which will be described later, are formed can be defined as one screw element.

In this manner, by segmenting the screw 20, its convenience can be significantly improved with respect to, for example, changes and adjustments to the specifications or the upkeep and maintenance of the screw 20.

In the present embodiment, the structure in which the tubes 36 and the axis of rotation 37 are fixed and kept from rotating is not limited to the above-described combination of the keys 51 and the keyways 53. For example, a spline structure as shown in FIG. 2 may be used instead.

Moreover, the segmental screw 20 is coaxially accommodated in the cylinder 21a of the barrel 21. Specifically, the screw main body 20p with the screw elements held along the axis of rotation 37 (the support portion 39) is rotatably accommodated in the cylinder 21a. In this state, a conveyance path 63 for conveying raw materials is formed between the outer circumferential surface 36s of the screw main body 20p and an inner surface 21s of the cylinder 21a. The conveyance path 63 has an annular sectional shape in the radial direction of the cylinder 21a, and extends in the axial direction along the cylinder 21a.

In the present embodiment, the screw main body 20p comprises first to third conveyance portions 42a, 42b, and 42c conveying raw materials and barrier portions 43 limiting the flow of raw materials. The conveyance portions 42a, 42b, and 42c and the barrier portions 43 are alternately disposed in the axial direction (longitudinal direction) of the screw main body 20p.

The first conveyance portion 42a is disposed at the basal end of the screw main body 20p, which corresponds to one end of the barrel 21. The second conveyance portion 42b and the third conveyance portion 42c are arranged to be adjacent to each other from the first conveyance portion 42a toward the tip of the screw main body 20p. Here, if the first to third conveyance portions 42a, 42b, and 42c are regarded as one group, groups identical to the group and the barrier portions 43 are alternately arranged in the axial direction (longitudinal direction) of the screw main body 20p.

In one group, the first to third conveyance portions 42a, 42b, and 42c are arranged to be adjacent to each other. The first conveyance portion 42a, the second conveyance portion 42b, and the third conveyance portion 42c are arranged in this order from the basal end toward the tip of the screw main body 20p. The third conveyance portion 42c is adjacent to a barrier portion 43.

A discharge conveyance portion 44 is disposed at the tip of the screw main body 20p, which corresponds to the other end of the barrel 21. The discharge conveyance portion 44 is configured to convey kneaded materials kneaded in the cylinder 21a in the same direction as the conveyance direction of the other conveyance portions 42a, 42b, and 42c.

[Structure in which Kneaded Materials are Extruded from the Basal End Toward the Tip of the Extruder Screw 20]

In the following description, the rotation direction (left-handed rotation or right-handed rotation) of the screw main body 20p is a rotation direction (left-handed rotation or right-handed rotation) from the perspective of the basal end side of the screw main body 20p. In addition, the twist direction (clockwise or anticlockwise) of the flights 45a, 45b, 45c, 46, and 48 is a twist direction (clockwise or anticlockwise) of the flights 45a, 45b, 45c, 46, and 48 from the perspective of the basal end side of the screw main body 20p.

The first to third conveyance portions 42a, 42b, and 42c are provided with the first to third flights 45a, 45b, and 45c spirally twisted. The first to third flights 45a, 45b, and 45c project from the outer circumferential surface in the circumferential direction of the tubes 36 toward the conveyance path 63. The flights 45a, 45b, and 45c are twisted from the basal end toward the tip of the screw main body 20p in the opposite direction to the rotation direction of the screw main body 20p. In this case, the twist pitch of the second flight 45b is set to be smaller than or equal to those of the first and third flights 45a and 45c. Moreover, the discharge conveyance portion 44 is provided with the flight 46 which is twisted in the opposite direction to the rotation direction of the screw main body 20p.

To give the second conveyance portion 42b a function as a backflow prevention portion which will be described later, that is, a function of preventing the backflow of raw materials, it is preferable that the twist pitch of the second flight 45b in the second conveyance portion 42b be set to be smaller than that of the third flight 45c in the third conveyance portion 42c.

Here, if raw materials are kneaded by rotating the screw main body 20p left-handed, the flights 45a, 45b, and 45c of the conveyance portions 42a, 42b, and 42c are twisted to convey the raw materials from the basal end toward the tip of the screw main body 20p. That is, the twist direction of each of the flights 45a, 45b, and 45c is set to be clockwise as in the case of a right-handed screw.

Moreover, if raw materials are kneaded by rotating the screw main body 20p left-handed, the flight 46 of the discharge conveyance portion 44 is twisted to convey the raw materials from the basal end toward the tip of the screw main body 20p. That is, the twist direction of the flight 46 is set to be clockwise as in the case of a right-handed screw.

On the other hand, if raw materials are kneaded by rotating the screw main body 20p right-handed, the flights 45a, 45b, and 45c of the conveyance portions 42a, 42b, and 42c are twisted to convey the raw materials from the basal end toward the tip of the screw main body 20p. That is, the twist direction of each of the flights 45a, 45b, and 45c is set to be anticlockwise as in the case of a left-handed screw.

Moreover, if raw materials are kneaded by rotating the screw main body 20p right-handed, the flight 46 of the discharge conveyance portion 44 is twisted to convey the raw materials from the basal end toward the tip of the screw main body 20p. That is, the twist direction of the flight 46 is set to be anticlockwise as in the case of a left-handed screw.

Each of the barrier portions 43 comprises the flight 48 spirally twisted. The flight 48 projects from the outer circumferential surface 36s in the circumferential direction of the tubes 36 toward the conveyance path 63. The flight 48 is twisted in the same direction as the rotation direction of the screw main body 20p.

Here, if raw materials are kneaded by rotating the screw main body 20p left-handed, the flight 48 of each of the barrier portions 43 is twisted to convey the raw materials from the tip toward the basal end of the screw main body 20p. That is, the twist direction of the flight 48 is set to be anticlockwise as in the case of a left-handed screw.

On the other hand, if raw materials are kneaded by rotating the screw main body 20p right-handed, the flight 48 of each of the barrier portions 43 is twisted to convey the raw materials from the tip toward the basal end of the screw main body 20p. That is, the twist direction of the flight 48 is set to be clockwise as in the case of a right-handed screw.

In each of the barrier portions 43, the twist pitch of the flight 48 is set to be smaller than or equal to those of the flights 45a, 45b, 45c, and 46 in the conveyance portions 42a, 42b, 42c, and 44 described above. Moreover, a slight clearance is secured between the apexes of the flights 45a, 45b, 45c, 46, and 48 and the inner surface 21s of the cylinder 21a of the barrel 21.

Each of the barrier portions 43 according to the present embodiment is designed, such that raw materials can flow over each of the barrier portions 43. In other words, each of the barrier portions 43 according to the present embodiment is designed, such that raw materials can flow through a space between each of the barrier portions 43 and the cylinder 21a in a state in which the extruder screw 20 is rotatably inserted in the cylinder 21a of the barrel 21. In this case, a gap 47 (see FIG. 12) between an outside diameter portion 43s of each of the barrier portions 43 and the inner surface 21s of the cylinder 21a is preferably set to be within a range of 0.1 to 3 mm. More preferably, the gap 47 is set to be within a range of 0.1 to 1.5 mm.

Figure 14:
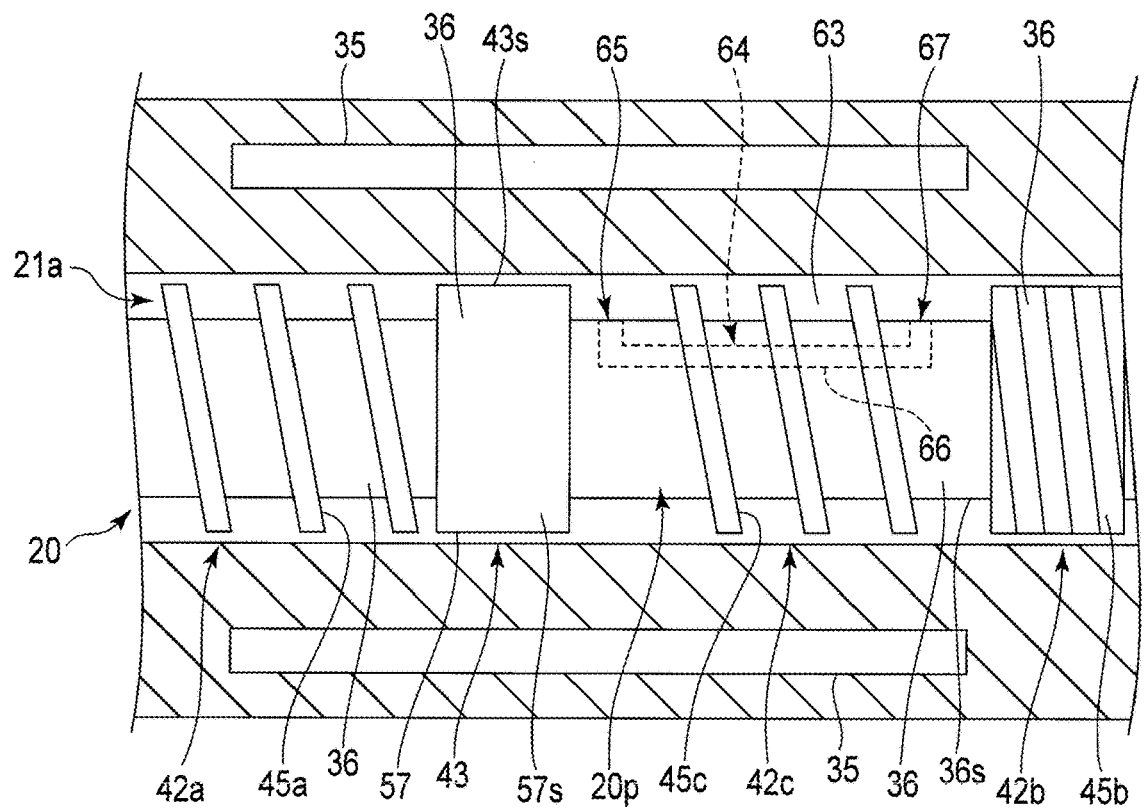
FIG. 14 is a sectional view showing the external structure of the extruder screw according to a modification of the present invention.
Figure 15:
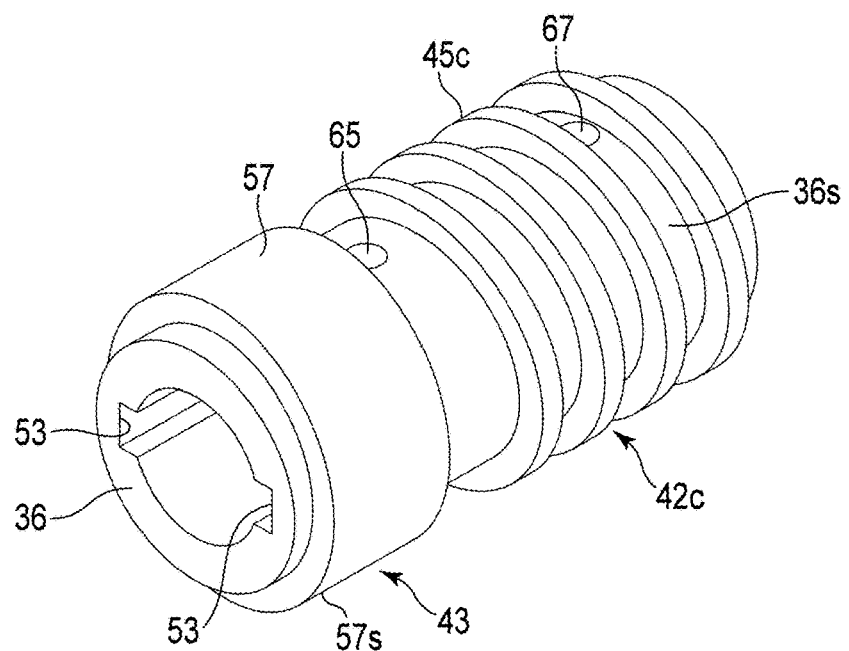
FIG. 15 is an expanded perspective view showing a part of a barrier annular body shown in FIG. 14.

In each of the barrier portions 43, a barrier annular body 57 (see FIG. 14 and FIG. 15) continuing in the circumferential direction along the outer circumferential surface 36s of the screw main body 20p may be provided instead of the flight 48. The barrier annular body 57 has a cylindrical surface 57s concentrically continuing in the circumferential direction with the axial line 41 as its center. The cylindrical surface 57s projects from the outer circumferential surface 36s in the circumferential direction of the tubes 36 toward the conveyance path 63. The space between the cylindrical surface 57s and the inner surface 21s of the cylinder 21a is set to be within the above-described range of the gap 47.

Incidentally, the lengths of the conveyance portions 42a, 42b, 42c, and 44 in the axial direction of the screw main body 20p are set as appropriate in accordance with, for example, the kind of raw materials, the degree of kneading of raw materials, and the production of kneaded materials per unit time. The conveyance portions 42a, 42b, 42c, and 44 are at least areas where the flights 45a, 45b, 45c, and 46 are formed on the outer circumferential surface 36s of the tubes 36, but are not limited to areas between the start points and the end points of the flights 45a, 45b, 45c, and 46.

That is, areas outside the flights 45a, 45b, 45c, and 46 of the outer circumferential surface 36s of the tubes 36 may be regarded as the conveyance portions 42a, 42b, 42c, and 44. For example, if a cylindrical spacer or a cylindrical collar is disposed at a position adjacent to the tubes 36 comprising the flights 45a, 45b, 45c, and 46, the spacer or the collar also can be included in the conveyance portions 42a, 42b, 42c, and 44.

In addition, the lengths of the barrier portions 43 in the axial direction of the screw main body 20p are set as appropriate in accordance with, for example, the kind of raw materials, the degree of kneading of raw materials, and the production of kneaded materials per unit time. The barrier portions 43 function to stop the flow of raw materials fed by the conveyance portions 42a, 42b, and 42c. That is, the barrier portions 43 are adjacent to the third conveyance portions 42c on the downstream side in the conveyance direction of raw materials, and configured to prevent raw materials fed by the conveyance portions 42a, 42b, and 42c from passing through the gap 47 between the apex of the flight 48 (the outside diameter portion 43s) and the inner surface 21s of the cylinder 21a.

In the above-described screw 20, each of the flights 45a, 45b, 45c, 46, and 48 projects from the outer circumferential surface 36s of the tubes 36 having the outside diameters D1 equal to each other toward the conveyance path 63. Thus, the outer circumferential surface 36s in the circumferential direction of each of the tubes 36 defines the root diameter of the screw 20. The root diameter of the screw 20 is kept at a fixed value over the total length of the screw 20.

Moreover, as shown in FIG. 5 to FIG. 8, the screw main body 20p internally comprises paths 64 extending in the axial direction. The paths 64 may be arranged with a space therebetween in the circumferential direction of the screw main body 20p, or be arranged with a space therebetween in the axial direction of the screw main body 20p. The figures show, as an example, the structure in which the paths 64 are arranged at regular intervals in the axial direction of the screw main body 20p.

The paths 64 are provided at positions eccentric to the axial line 41, which is the center of rotation of the screw 20. That is, the paths 64 are shifted from the axial line 41. Thus, the paths 64 revolve around the axial line 41 with the rotation of the screw main body 20p.

With respect to the shapes of the paths 64, their sectional shapes can be, for example, circular, rectangular, or elliptical, as long as raw materials can flow therethrough. The figures show, as an example, the paths 64 whose sections are circular holes. In this case, the inside diameter (bore) of the holes is preferably set to be greater than or equal to 1 mm but less than 6 mm. More preferably, the inside diameter (bore) of the holes is set to be greater than or equal to 1 mm but less than 5 mm.

Hereinafter, a specific structure of the above-described paths 64 will be described.

Figure 8:
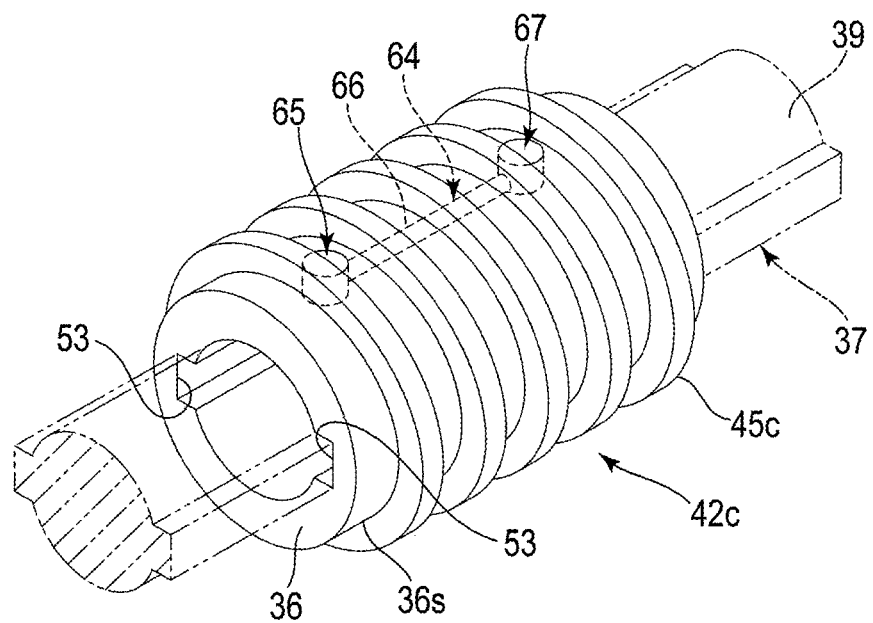
FIG. 8 is a perspective view showing a structural example of a screw element of the extruder screw.
Figure 9:
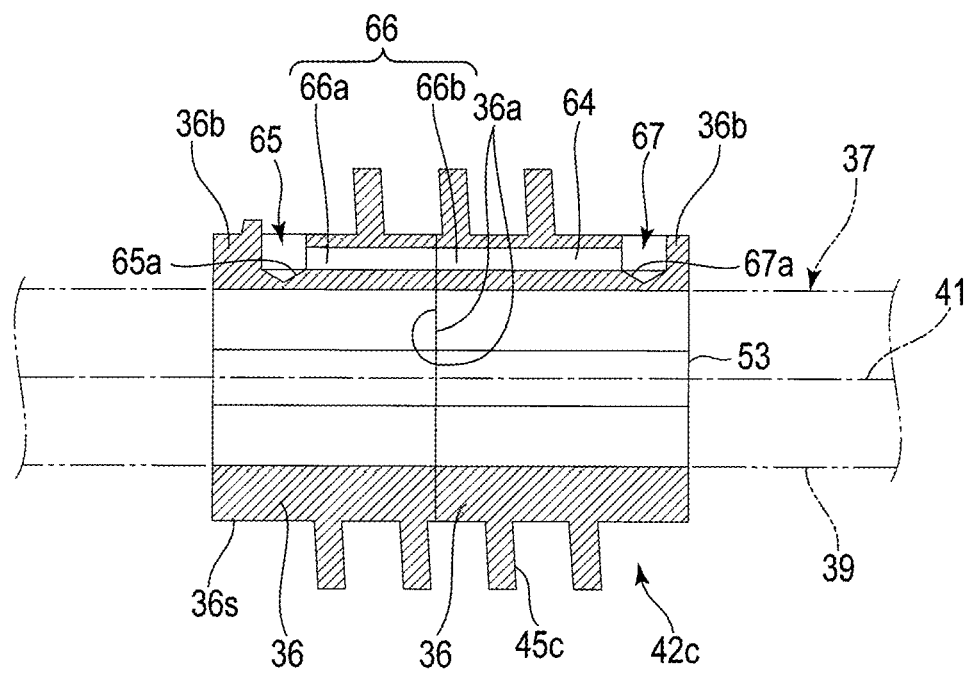
FIG. 9 is an expanded sectional view showing a part of a structure of a path formed over two tubes.

As shown in FIG. 6, FIG. 8, FIG. 9, in the extruder screw 20 according to the present embodiment, the paths 64 are provided with a space therebetween in the axial direction (longitudinal direction) inside the screw main body 20p in which the above-described groups (the first to third conveyance portions 42a, 42b, and 42c) and the barrier portions 43 are alternately arranged in the axial direction (longitudinal direction). By this screw structure, the screw 20 comprising the screw main body 20p having the function of continuously imparting shearing action and extension action to raw materials can be achieved.

In the present embodiment, the paths 64 are formed in the tubes 36 of the third conveyance portions 42c of the above-described groups. That is, inside the screw main body 20p, the tubes 36 of the third conveyance portions 42c comprise tubular wall surfaces 52 defining the paths 64, which are holes. In this case, the paths 64 are holes composed of hollow spaces only. The wall surfaces 52 continuously surround the hollow paths 64 in the circumferential direction. The paths 64 are thereby formed as hollow spaces which allow only the flow of raw materials. In other words, inside the paths 64, there are no other elements constituting the screw main body 20p. In this case, the wall surfaces 52 revolve around the axial line 41 without rotating on the axial line 41, when the screw main body 20p rotates.

According to the above-described paths 64, when raw materials conveyed through the conveyance path 63 by each of the conveyance portions 42a, 42b, and 42c flow through the paths 64, "extension action", caused when the raw materials pass from a wide place (the conveyance path 63) to a narrow place (the paths 64), can be effectively imparted to the raw materials.

Here, if we focus on a third conveyance portion 42c in which a path 64 is formed, and a second conveyance portion 42b and a barrier portion 43 which are adjacent to both sides of the third conveyance portion 42c in the above-described screw structure, they can be regarded as one structurally united unit. The one unit has a structure as an axial circulation portion which circulates raw materials in the axial direction.

The screw main body 20p according to the present embodiment is formed by arranging units identical to the unit in the axial direction (longitudinal direction) and disposing the first conveyance portions 42a therebetween adjacently. The screw structure in which the above-described axial circulation portion is provided at places is thereby achieved.

In other words, the above-described one unit can be regarded as one functionally united module. As the functions of one module, for example, the following functions are assumed in addition to the function of circulating raw materials in the axial direction: the function of imparting shearing action to raw materials, the function of imparting extension action to raw materials, the function of stopping the conveyance of raw materials with the barrier portions 43, the function of guiding raw materials, the pressure on which has been increased by the barrier portions 43, to the paths 64, and the function of forming a raw-material receiver R in which the filling rate of raw materials is 100% just before the barrier portions 43.

Moreover, in the above-described screw structure, the paths 64 each comprise an entrance 65, an exit 67, and a path main body 66 connecting the entrance 65 and the exit 67. The entrance 65 and the exit 67 are provided within the third conveyance portion 42*c* in the above-described one unit (axial circulation portion). Within the third conveyance portion 42*c*, the entrance 65 is provided on one side of the path main body 66 (portion closer to the tip of the screw main body 20*p*), and the exit 67 is provided on the other side of the path main body 66 (portion closer to the basal end of the screw main body 20*p*).

The positions where the entrance 65 and the exit 67 are formed can be freely set within the third conveyance portion 42*c*. For example, to increase the cycle of circulation in the third conveyance portion 42*c*, the entrance 65 is made closer to the barrier portion 43 and the exit 67 is made closer to the second conveyance portion 42*b*. To decrease the cycle of circulation in the third conveyance portion 42*c*, the entrance 65 is made remote from the barrier portion 43 and the exit 67 is made remote from the second conveyance portion 42*b*. The figures show, as an example, the structure in which the cycle of circulation is increased.

The entrance 65 is a hole bored in the radial direction in the outer circumferential surface 36*s* of the tubes 36 (the screw main body 20*p*) within the third conveyance portion 42*c*. The entrance 65 can be formed by, for example, machining with a drill. As a result, a bottom portion 65*a* of the entrance 65 is formed as an inclined surface shaved off into the shape of a cone by the tip of the drill. In other words, the bottom portion 65*a* in the shape of a cone is an inclined surface widening toward the outer circumferential surface 36*s* of the screw main body 20*p*.

The exit 67 is a hole bored in the radial direction in the outer circumferential surface 36*s* of the tubes 36 (the screw main body 20*p*) within the third conveyance portion 42*c*. The exit 67 can be formed by, for example, machining with a drill. As a result, a bottom portion 67*a* of the exit 67 is formed as an inclined surface shaved off into the shape of a cone by the tip of the drill. In other words, the bottom portion 67*a* in the shape of a cone is an inclined surface widening toward the outer circumferential surface 36*s* of the screw main body 20*p*.

In the present embodiment, the third conveyance portion 42*c* is formed along the outer circumferential surface 36*s* of two tubes 36 adjacent to each other in the axial direction. The path main body 66 is formed inside both the tubes 36. The path main body 66 is composed of first and second portions 66*a* and 66*b*. The first portion 66*a* is formed inside one of the tubes 36. The second portion 66*b* is formed inside the other of the tubes 36.

In the one tube 36, the first portion 66*a* extends parallel to the axial line 41. One end of the first portion 66*a* is opened in an end face 36*a* of the tube 36. The other end of the first portion 66*a* is closed by an end wall 36*b* of the tube 36. Moreover, the other end of the first portion 66*a* communicates with and is connected to the above-described entrance 65.

In the other tube 36, the second portion 66*b* extends parallel to the axial line 41. One end of the second portion 66*b* is opened in an end face 36*a* of the tube 36. The other end of the second portion 66*b* is closed by an end wall 36*b* of the tube 36. Moreover, the other end of the second portion 66*b* communicates with and is connected to the above-described exit 67.

The path main body 66 can be formed by constricting the tube 36 in which the first portion 66*a* is formed and the tube 36 in which the second portion 66*b* is formed in the axial direction, and firmly affixing the end faces 36*a* thereof to each other. In this state, the path main body 66 extends straight and continuously without branching on the way in the axial direction of the screw main body 20*p*. In addition, both sides of the path main body 66 communicate with and are connected to the entrance 65 and the exit 67 described above.

In this case, the bore of the path main body 66 may be set to be smaller than those of the entrance 65 and the exit 67, or may be set to be equal to them. In either case, the path sectional area defined by the bore of the path main body 66 is set to be much smaller than the annular sectional area in the radial direction of the above-described annular conveyance path 63.

In the present embodiment, each of the tubes 36 on which at least parts of the flights 45*a*, 45*b*, 45*c*, 46, and 48 are formed can be regarded as a screw element corresponding to one of the conveyance portions 42*a*, 42*b*, 42*c*, and 44 and the barrier portions 43. FIG. 8 shows the tubes 36 of the third conveyance portions 42*c* in which the above-described path 64 (the entrance 65, the path main body 66, and the exit 67) is provided as an example of the screw element. In the third conveyance portions 42*c*, the entrance 65 and the exit 67 are formed in the outer circumferential surface 36*s* of the tubes 36.

Figure 10:
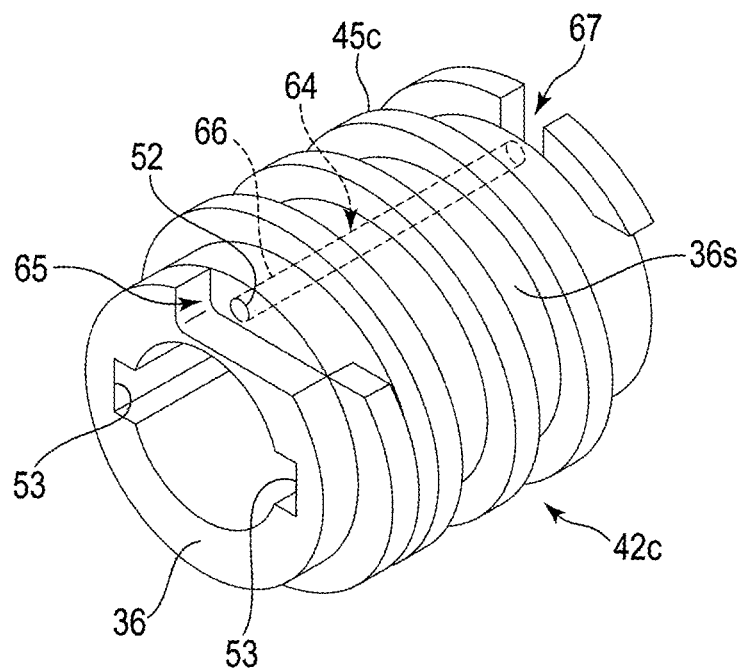
FIG. 10 is a perspective view showing another structural example of the screw element of the extruder screw.

As another structure of the path 64, for example, the path main body 66 may be formed to penetrate the tubes 36 in the axial direction as shown in FIG. 10. In this case, the entrance 65 and the exit 67 are formed by cutting out parts of both end faces in the axial direction of the tubes 36 into the shape of depressions. According to this structure, the one continuous path main body 66 can be formed simply by making a lateral hole penetrate the tubes 36.

According to the above-described element structure, screw elements can be held in free order and combination along the axis of rotation 37 (that is, the support portion 39). Therefore, the conveyance portions 42*a*, 42*b*, 42*c*, and 44 and the barrier portions 43 can be exchanged and rearranged in accordance with, for example, the degree of kneading of raw materials, and the exchange and the rearrangement can be easily performed.

Moreover, in order to form the path 64 in the screw main body 20*p*, it suffices that a process for providing the path 64 is performed for the tubes 36 having a length sufficiently shorter than the total length of the screw main body 20*p*, that is, the two tubes 36 of the third conveyance portion 42*c*. Thus, the paths 64 can be easily processed and handled when being formed.

Furthermore, according to the element structure, axial circulation portions identical to the above-described axial circulation portion can be arranged in the axial direction in the screw main body 20*p*. In each of the axial circulation portions, the conveyance of raw materials conveyed in the axial direction by the third conveyance portion 42*c* is limited by the barrier portion 43, and thus, the pressure on the raw materials is increased. At this time, some of the raw materials, the pressure on which has been increased, flow into the entrance 65, and then flow through the path main body 66 toward the exit 67. Then, the raw materials which have flowed out of the exit 67 are guided toward the outer circumferential surface 36s in the circumferential direction of the third conveyance portion 42c by the second conveyance portion 42b. The raw materials which have been guided to the outer circumferential surface 36s are conveyed in the axial direction by the third conveyance portion 42c, and then, the operation described above is repeated.

According to the axial circulation portions, "shearing action", caused by a difference in speed between the third flights 45c of the third conveyance portions 42c rotating along the conveyance path 63 and the inner surface 21s of the cylinder 21a, is imparted to raw materials conveyed in the axial direction by the third conveyance portions 42c, and stirring action, caused by the rotation of the spiral flights 45c, is imparted to them. Moreover, the above-described "extension action" is imparted to raw materials flowing through the path main body 66 from the entrance 65 toward the exit 67. The nanodispersion of the raw materials is thereby promoted.

Thus, the screw structure in which the axial circulation portions are provided with a space therebetween (for example, at regular intervals) in the axial direction of the screw main body 20p, and thus shearing action regions and extension action regions alternately continue in the axial direction can be achieved. The figures show, as an example, the extruder screw 20 having the screw structure in which the axial circulation portions and the first conveyance portions 42a are alternately disposed in the axial direction.

Moreover, in the axial circulation portions, the second conveyance portions 42b can be given a function as a backflow prevention portion by setting the twist pitch of the second flights 45b in the second conveyance portions 42b smaller than that of the third flights 45c in the third conveyance portions 42c. In this case, the force by which raw materials are conveyed in the conveyance direction is improved by the amount by which the twist pitch of the second flights 45b of the second conveyance portions 42b is made smaller. In other words, the force by which the flow of raw materials in the opposite direction to the conveyance direction is restrained is improved by the amount by which the twist pitch of the second flights 45b of the second conveyance portions 42b is made smaller.

Raw materials which have flowed out of the exits 67 of the third conveyance portions 42c are thereby prevented from flowing in the opposite direction to the conveyance direction by the second conveyance portions 42b. At the same time, the flow of the raw materials which have flowed out of the exits 67 in the conveyance direction is promoted by the second conveyance portions 42b. As a result, the raw materials can spread all over the third conveyance portions 42c in the circumferential direction thoroughly and efficiently.

Next, the operation of kneading raw materials with the extruder screw 20 having the above-described structure will be described. In this description of the operation, it is assumed that kneaded materials are extruded from the basal end toward the tip of the screw main body 20p while the extruder screw 20 is rotated left-handed in an anticlockwise direction. In this case, raw materials are continuously supplied to the second extruder 3 comprising the extruder screw 20 from the first extruder 2. The raw materials are raw materials in a melted state produced by preliminarily kneading materials in the first extruder 2.

Figure 11:
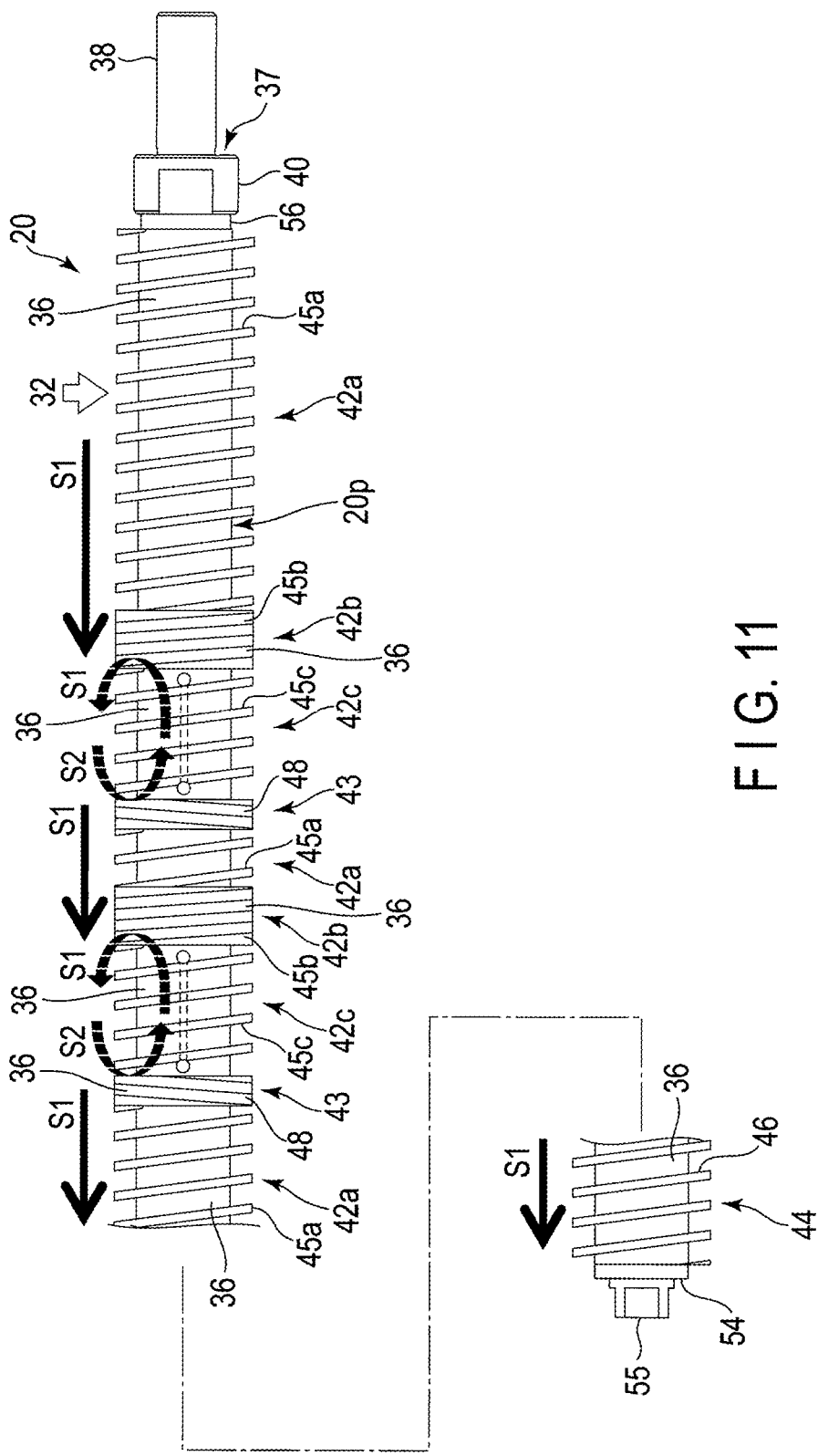
FIG. 11 is a diagram schematically showing a flowing state of raw materials produced by the extruder screw.
Figure 12:
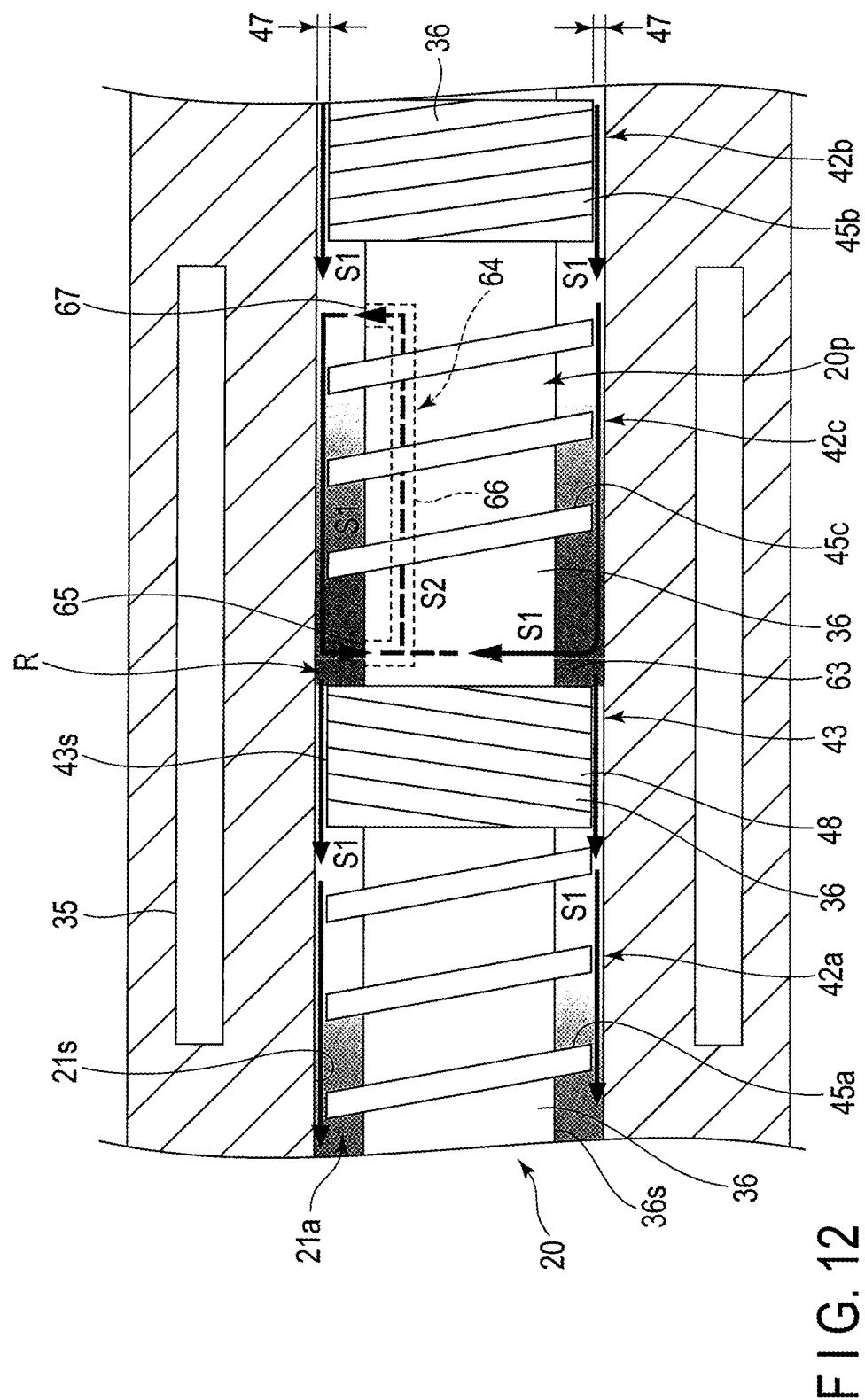
FIG. 12 is an expanded sectional view showing a part of the flowing state of raw materials in a cylinder of the second extruder.

As shown in FIG. 11 and FIG. 12, the raw materials supplied to the second extruder 3 are continuously supplied from the supply port 32 (see FIG. 5 and FIG. 6) of the barrel 21 toward the outer circumferential surface 36s of the screw main body 20p. The supplied raw materials are conveyed in an S1-direction from the basal end toward the tip of the screw main body 20p by the first to third flights 45a, 45b, and 45c of the first to third conveyance portions 42a, 42b, and 42c.

During the conveyance in the S1-direction, "shearing action", caused by a difference in speed between the flights 45a, 45b, and 45c of the conveyance portions 42a, 42b, and 42c rotating along the conveyance path 63 and the inner surface 21s of the cylinder 21a, is imparted to the raw materials, and stirring action, caused by the rotation of the spiral flights 45a, 45b, and 45c, is imparted to them. The nanodispersion of the raw materials is thereby promoted.

The conveyance of the raw materials conveyed in the S1-direction is limited by the barrier portions 43. That is, the flights 48 of the barrier portions 43 act to convey the raw materials from the tip toward the basal end of the screw main body 20p in the opposite direction to the S1-direction. As a result, the flow of raw materials is limited by the barrier portions 43.

Because the flow of raw materials is limited, the pressure on the raw materials is increased. Specifically, FIG. 12 shows the filling rate of raw materials at the places in the conveyance path 63, which correspond to the third conveyance portions 42c of the screw main body 20p, with gradations. That is, in the conveyance path 63, the filling rate of raw materials becomes greater as the tone becomes darker. As is clear from FIG. 12, the filling rate of raw materials becomes greater as they approach the barrier portions 43 in the conveyance path 63 corresponding to the third conveyance portions 42c. Just before the barrier portions 43, the filling rate of raw materials is 100%.

Thus, just before the barrier portions 43, the "raw-material receiver R" in which the filling rate of raw materials is 100% is formed. In the raw-material receiver R, the flow of raw materials is limited, and thus, the pressure on the raw materials is increased. The raw materials, the pressure on which has been increased, continuously flow into the path main body 66 from the entrance 65 opening in the outer circumferential surface 36s of the third conveyance portions 42c (the tubes 36), and flow through the path main body 66 in an S2-direction from the tip toward the basal end of the screw main body 20p in the opposite direction to the S1-direction.

As described above, the path sectional area defined by the bore of the path main body 66 is much smaller than the annular sectional area of the conveyance path 63 in the radial direction of the cylinder 21a. From another point of view, a widening area based on the bore of the path main body 66 is much smaller than that of the annular conveyance path 63. Therefore, the raw materials are rapidly squeezed when flowing from the entrance 65 into the path main body 66, and thus, "extension action" is imparted to the raw materials.

Moreover, since the path sectional area is sufficiently smaller than the annular sectional area, raw materials collecting in the raw-material receiver R do not disappear. That is, some of the raw materials collecting in the raw-material receiver R continuously flow into the entrance 65. In the meantime, new raw materials are fed toward the barrier portions 43 by the third flights 45c of the third conveyance portions 42c. As a result, the filling rate just before the barrier portions 43 in the raw-material receiver R is thereby kept at 100% all the time. At this time, even if the amount of raw materials conveyed by the third flights 45c somewhat changes, the change is absorbed by raw materials remaining in the raw-material receiver R. Raw materials can be thereby continuously and stably supplied to the path main body 66. Thus, in the path main body 66, extension action can be uninterruptedly and continuously imparted to the raw materials.

The raw materials which have passed through the path main body 66 flow out of the exit 67 toward the outer circumferential surface 36s of the screw main body 20p. The raw materials which have flowed out of the exit 67 are guided to the outer circumferential surface 36s in the circumferential direction of the third conveyance portions 42c by the second conveyance portions 42b having the above-described function as a backflow prevention portion.

The raw materials which have been guided to the outer circumferential surface 36s are conveyed in the S1-direction by the third conveyance portions 42c. The conveyance of the raw materials which have been conveyed in the S1-direction is limited by the barrier portions 43, and thus, the raw materials flow into the entrance 65. Then, the operation described above is repeated.

While the operation is repeated, some of the raw materials, the flow of which is limited by the barrier portions 43, pass through the gap 47 between the outside diameter portions 43s of the barrier portions 43 and the inner surface 21s of the cylinder 21a, and are supplied to the first conveyance portions 42a adjacent to the downstream side of the barrier portions 43.

On the screw main body 20p, the conveyance portions 42a, 42b, and 42c and the barrier portions 43 described above are alternately arranged in the axial direction. In other words, the axial circulation portions and the first conveyance portions 42a described above are alternately arranged in the axial direction. Thus, the above-described series of shearing and extension operations is repeated. Raw materials in the cylinder 21a are thereby continuously conveyed from the basal end toward the tip of the screw main body 20p in a state in which a shearing flow and an extension flow are repeated. As a result, the degree of kneading of the raw materials is increased.

To the tip of the screw main body 20p, kneaded materials kneaded at a nanolevel are conveyed. The conveyed kneaded materials are conveyed in the S1-direction by the flight 46 of the discharge conveyance portion 44, and then, continuously extruded from the discharge port 33 (see FIG. 5 and FIG. 6).

Gaseous components included in the kneaded materials which have been extruded from the discharge port 33 of the second extruder 3 are drawn and removed by the third extruder 4, and then, the kneaded materials are discharged to the outside. The discharged kneaded materials are, for example, soaked in cooling water stored in a water tank, and forcibly cooled. In this manner, a desired resin molding is obtained.

Here, results of a high dispersion verification test performed on kneaded materials in the case where raw materials are kneaded by the above-described shearing and extension operation will be described.

In the test, the two kinds of materials 5, a polycarbonate (PC) resin and a polymethyl methacrylate (PMMA) resin, are supplied to the first extruder 2, and the materials 5 in a melted state are produced by preliminarily kneading them. In addition, the materials 5 in a melted state are continuously supplied from the first extruder 2 to the second extruder 3 as raw materials of the second extruder 3.

In the test, the extruder screw 20 is configured, such that the above-described axial circulation portions are disposed at three places in the axial direction and raw materials pass through each of the paths 64. Further, the specifications of the extruder screw 20 are set as follows: the screw diameter is set at 36 mm, the screw effective length (L/D) is set at 16.7, the screw rotational rate is set at 2,500 rpm, the supply of raw materials is set at 10.0 kg/h, and the barrel set temperature is set at 240° C.

Through the above-described test, intended transparent kneaded materials were continuously obtained.

As described above, according to the present embodiment, shearing action regions and extension action regions alternately continue in the axial direction, and thus, kneaded materials can be continuously produced while shearing action and extension action are imparted to raw materials. In this case, raw materials can be continuously supplied from the first extruder 2 to the second extruder 3 without making them remaining. The completely continuous production, not apparently continuous production, of kneaded materials can be thereby enabled.

As a result, the optimum operating conditions can be set for the first extruder 2 and the second extruder 3, while their operating conditions are associated with each other. For example, if resin is preliminarily kneaded with the first extruder 2, the screw rotational rate can be set at 100 to 300 rpm as it has been conventionally set. Thus, the resin can be sufficiently heated and melted, and preliminarily kneaded. At this time, in the second extruder 3, the screw 20 can be rotated at a high rate of 600 to 3,000 rpm. Thus, shearing action and extension action can be alternately and effectively imparted to the resin.

Furthermore, according to the present embodiment, the number of times shearing action and extension action are imparted to raw materials can be accurately set simply by arranging the axial circulation portions in the axial direction. Kneaded materials of an optimum degree of kneading can be thereby produced all the time. In this case, in each of the axial circulation portions, some circulating raw materials are continuously conveyed over the barrier portions 43, and thus, no problem will arise in the completely continuous production of kneaded materials.

Moreover, according to the present embodiment, raw materials can flow through one path 64 more than once in each of the axial circulation portions. Thus, the number of times extension action is imparted can be increased without elongating the total length of the screw 20 or additionally setting a mechanism which imparts extension action to raw materials. The degree of kneading can be thereby improved while the extruder screw 20 is made smaller.

Furthermore, according to the present embodiment, the outside diameter D1 of the screw main body 20p (each of the tubes 36) is set at a fixed value, in other words, the root diameter of the screw 20 is set at a fixed value over the total length of the screw 20. Thus, the segmental screw 20 in which screw elements can be held in free order and combination can be achieved. By segmenting the screw 20, its convenience can be significantly improved with respect to, for example, changes and adjustments to the specifications or the upkeep and maintenance of the screw 20.

In addition, the root diameter of the screw 20 is set at a fixed value over the total length of the screw 20. Thus, the conveyance path 63 for conveying raw materials has uniform annular sectional shapes over the total length of the screw 20. When shearing action and extension action are alternately imparted to raw materials, they can be sequentially and smoothly imparted, and uniform kneading can be performed.

Moreover, according to the present embodiment, the sectional area of the paths 64 (the path main bodies 66) is set to be much smaller than that of the conveyance path 63 for conveying raw materials. Thus, extension action can be uniformly, stably and efficiently imparted to raw materials passing through the paths 64 (the path main bodies 66).

Furthermore, in the screw 20, the conveyance portions 42a, 42b, and 42c, the barrier portions 43, and the paths 64 are disposed in combination without a plasticization zone provided in a screw of a conventional single screw extruder. Thus, the second extruder 3 can be easily operated.

While one of the embodiments of the present invention has been hereinabove described, the present invention is not limited to the one embodiment. The following modifications are also included in the technical scope of the present invention.

[Structure in which Kneaded Materials are Extruded from the Tip Toward the Basal End of the Extruder Screw 20]

In the following description, the rotation direction (left-handed rotation or right-handed rotation) of the screw main body 20p is a rotation direction (left-handed rotation or right-handed rotation) from the perspective of the basal end side of the screw main body 20p. In addition, the twist direction (clockwise or anticlockwise) of flights 60a, 60b, 60c, 61a, 61b, and 61c is a twist direction (clockwise or anticlockwise) of the flights 60a, 60b, 60c, 61a, 61b, and 61c from the perspective of the basal end side of the screw main body 20p.

Figure 13:
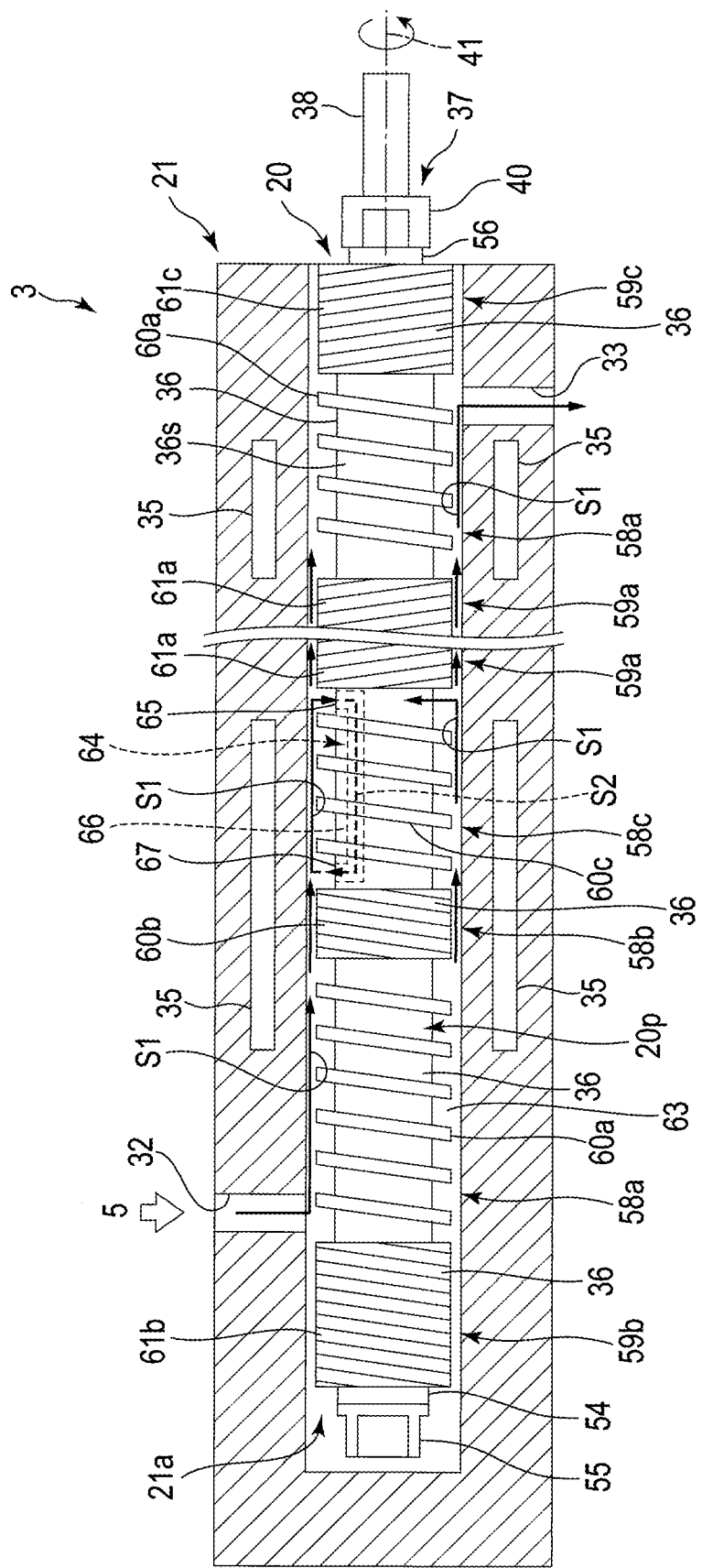
FIG. 13 is a sectional view schematically showing a structure of the second extruder according to a modification of the present invention.

FIG. 13 shows the structures of the second extruder 3 according to a modification of the present invention and the extruder screw 20 according to the modification of the present invention applied to the second extruder 3.

In the second extruder 3 according to the present modification, the supply port 32 is provided on the other end side of the barrel 21, and the discharge port 33 is provided on the one end side of the barrel 21. In addition, in the extruder screw 20, first to third conveyance portions 58a, 58b, and 58c and barrier portions 59a, 59b, and 59c are alternately arranged from the tip toward the basal end of the screw main body 20p.

In a state in which the extruder screw 20 according to the present modification is rotatably inserted in the cylinder 21a of the barrel 21, the basal ends of the extruder screw 20 and the screw main body 20p are positioned on the one end side of the barrel 21, on which the discharge port 33 is provided, and the tips of the extruder screw 20 and the screw main body 20p are positioned on the other end side of the barrel 21, on which the supply port 32 is provided.

In this case, each of the conveyance portions 58a, 58b, and 58c is configured to convey raw materials supplied from the supply port 32 toward the discharge port 33 in the S1-direction. Each of the barrier portions 59a disposed between the tip barrier portion 59b and the basal-end barrier portion 59c is configured to limit the conveyance of raw materials by each of the conveyance portions 58a, 58b, and 58c. In addition, the basal-end barrier portion 59c is provided at the basal end of the screw main body 20p, and limits kneaded materials conveyed by the first conveyance portion 58a adjacent to the basal-end barrier portion 59c to make them progress toward the discharge port 33. On the other hand, the tip barrier portion 59b is provided at the tip of the screw main body 20p, and limits raw materials supplied from the supply port 32 to make them progress in the conveyance direction S1.

In the conveyance portions 58a, 58b, and 58c, the first to third flights 60a, 60b, and 60c spirally twisted along the outer circumferential surface 36s of the screw main body 20p are provided, respectively. The respective flights 60a, 60b, and 60c are twisted from the basal end toward the tip of the screw main body 20p in the same direction as the rotation direction of the screw main body 20p.

FIG. 13 shows the structure in the case where raw materials are kneaded by rotating the screw main body 20p left-handed. In this case, the twist direction of each of the flights 60a, 60b, and 60c is set to be anticlockwise as in the case of a left-handed screw to convey raw materials from the tip toward the basal end of the screw main body 20p. If raw materials are kneaded by rotating the screw main body 20p right-handed, it suffices that the twist direction of each of the flights 60a, 60b, and 60c is set to be opposite to that in the above-described case of left-handed rotation.

In addition, the second conveyance portion 58b can be given a function as a backflow prevention portion by setting the twist pitch of the second flight 60b in the second conveyance portion 58b smaller than that of the third flight 60c in the third conveyance portion 58c. In this case, the force by which raw materials are conveyed in the conveyance direction is improved by the amount by which the twist pitch of the second flight 60b of the second conveyance portion 58b is made smaller. In other words, the force by which the flow of raw materials in the opposite direction to the conveyance direction is restrained is improved by the amount by which the twist pitch of the second flight 60b of the second conveyance portion 58b is made smaller.

Raw materials which have flowed out of the exit 67 of the third conveyance portion 58c are thereby prevented from flowing in the opposite direction to the conveyance direction by the second conveyance portion 58b. At the same time, the flow of the raw materials which have flowed out of the exit 67 in the conveyance direction is promoted by the second conveyance portion 58b. As a result, the raw materials can be efficiently and thoroughly spread all over the third conveyance portion 58c in the circumferential direction.

Moreover, in each of the barrier portions 59a, 59b, and 59c, the barrier annular body 57 (see FIG. 14 and FIG. 15) continuing in the circumferential direction along the outer circumferential surface 36s of the screw main body 20p may be provided, or the barrier flights 61a, 61b, and 61c (see FIG. 13) spirally twisted along the outer circumferential surface 36s of the screw main body 20p may be provided.

If the barrier flights 61a, 61b, and 61c are provided, the barrier flight 61c twisted from the basal end toward the tip of the screw main body 20p in the opposite direction to the rotation direction of the screw main body 20p is provided in the basal-end barrier portion 59c disposed at the basal end of the screw main body 20p. On the other hand, the barrier flight 61b twisted from the basal end toward the tip of the screw main body 20p in the same direction as the rotation direction of the screw main body 20p is provided in the tip barrier portion 59b disposed at the tip of the screw main body 20p. Moreover, the barrier flight 61a twisted from the basal end toward the tip of the screw main body 20p in the opposite direction to the rotation direction of the screw main body 20p is provided in each of the barrier portions 59a provided between the two barrier portions 59b and 59c.

Here, if raw materials are kneaded by rotating the screw main body 20p left-handed, the twist direction of the barrier flight 61b in the tip barrier portion 59b is set to be anticlockwise as in the case of a left-handed screw from the basal end toward the tip of the screw main body 20p. On the other hand, the twist direction of the barrier flights 61a and 61c of the other barrier portions 59a and 59c is set to be clockwise as in the case of a right-handed screw from the basal end toward the tip of the screw main body 20p. If raw materials are kneaded by rotating the screw main body 20p right-handed, it suffices that the twist direction of each of the barrier flights 61a, 61b, and 61c is set to be opposite to that in the above-described case of left-handed rotation.

The other structures (for example, the structure of the paths 64 formed in the tubes 36 of the third conveyance portions 58c) can be set based on the above-described "structure in which kneaded materials are extruded from the basal end toward the tip of the extruder screw 20", and thus, description thereof is omitted.

Next, the operation of kneading raw materials with the extruder screw 20 having the above-described structure will be described. In the description of the operation, it is assumed that kneaded materials are extruded from the tip toward the basal end of the screw main body 20p while the extruder screw 20 is rotated left-handed in an anticlockwise direction.

As shown in FIG. 13, raw materials continuously supplied from the supply port 32 of the barrel 21 toward the outer circumferential surface 36s of the screw main body 20p are conveyed in the S1-direction from the tip toward the basal end of the screw main body 20p by the flights 60a, 60b, and 60c of the first to third conveyance portions 58a, 58b, and 58c.

During the conveyance in the S1-direction, "shearing action", caused by a difference in speed between the flights 60a, 60b, and 60c of the conveyance portions 58a, 58b, and 58c rotating along the conveyance path 63 and the inner surface 21s of the cylinder 21a, is imparted to the raw materials, and stirring action, caused by the rotation of the spiral flights 60a, 60b, and 60c, is imparted to them. The nanodispersion of the raw materials is thereby promoted.

The conveyance of the raw materials conveyed in the S1-direction along the conveyance path 63 is limited by the barrier portions 59a. That is, the flights 61a of the barrier portions 59a are twisted to convey the raw materials from the basal end toward the tip of the screw main body 20p in the opposite direction to the S1-direction. As a result, the flow of raw materials is limited by the barrier portions 59a.

Because the flow of raw materials is limited, the pressure on the raw materials is increased. Although not particularly shown in the figures, also in the present modification, just before the barrier portions 59a, the filling rate of raw materials is 100% and the pressure on the raw materials is increased as in the above-described embodiment. Some of the raw materials, the pressure on which has been increased, continuously flow into the path main body 66 from the entrance 65, and flow through the path main body 66 in the S2-direction from the basal end toward the tip of the screw main body 20p in the opposite direction to the S1-direction. The above-described "extension action" is imparted to the raw materials while they are flowing in the S2-direction.

The raw materials which have passed through the path main body 66 flow out of the exit 67 toward the outer circumferential surface 36s of the screw main body 20p. The raw materials which have flowed out of the exit 67 are guided to the outer circumferential surface 36s in the circumferential direction of the third conveyance portion 58c by the second conveyance portion 58b having the above-described function as a backflow prevention portion.

The raw materials which have been guided to the outer circumferential surface 36s are conveyed in the S1-direction by the third conveyance portion 58c. The conveyance of the raw materials which have been conveyed in the S1-direction is limited by the barrier portion 59a, and thus, the raw materials flow into the entrance 65. Then, the operation described above is repeated.

While the operation is repeated, some of the raw materials, the flow of which is limited by the barrier portion 59a, pass through the gap between the outside diameter portion of the barrier portion 59a and the inner surface 21s of the cylinder 21a, and are supplied to the first conveyance portion 58a adjacent to the downstream side of the barrier portion 59a.

On the screw main body 20p, the conveyance portions 58a, 58b, and 58c and the barrier portions 59a described above are alternately arranged in the axial direction. Thus, when the above-described series of shearing and extension operations is repeated, raw materials in the cylinder 21a are continuously conveyed from the tip toward the basal end of the screw main body 20p in a state in which a shearing flow and an extension flow are repeated. The degree of kneading of raw materials is thereby increased.

Then, to the basal end of the screw main body 20p, kneaded materials kneaded at a nanolevel are conveyed. The conveyed kneaded materials are conveyed in the S1-direction by the first conveyance portion 58a adjacent to the basal-end barrier portion 59c, and then continuously extruded from the discharge port 33 while the conveyance of the kneaded materials is limited by the basal-end barrier portion 59c.

The advantages of the second extruder 3 and the extruder screw 20 according to the present modification are the same as those of the above-described one embodiment, and thus, description thereof is omitted.

OTHER MODIFICATIONS

In the above-described one embodiment, it has been assumed that the paths 64 (specifically, the path main bodies 66) are formed inside the screw main body 20p (the tubes 36). However, instead, the paths 64 (the path main bodies 66) may be formed at boundaries between each of the tubes 36 and the axis of rotation 37 when the support portion 39 of the axis of rotation 37 is made to penetrate along the inner circumferential surface of each of the tubes 36 constituting the screw main body 20p. FIG. 16 to FIG. 19 show the structure of a portion corresponding to FIG. 7 as the structure of the present modification.

The paths 64 shown in FIG. 16 are composed of wall surfaces 52a formed by recessing parts of the inner circumferential surfaces of the tubes 36 into the shape of depressions in the axial direction. In this case, the paths 64 surrounded by the wall surfaces 52a and the outer circumferential surface of the support portion 39 can be defined by making the axis of rotation 37 (the support portion 39) penetrate along the inner circumferential surfaces of the tubes 36.

The paths 64 shown in FIG. 17 are composed of wall surfaces 52b formed by recessing parts of the outer circumferential surface of the axis of rotation 37 (the support portion 39) into the shape of depressions in the axial direction. In this case, the paths 64 surrounded by the wall surfaces 52b and the inner circumferential surfaces of the tubes 36 can be defined by making the axis of rotation 37 (the support portion 39) penetrate along the inner circumferential surfaces of the tubes 36.

The paths 64 shown in FIG. 18 are composed of wall surfaces 52c formed by recessing parts of the outer peripheral surfaces of the keys 51 into the shape of depressions in the axial direction. In this case, the paths 64 surrounded by the wall surfaces 52c and groove bottom surfaces of the keyways 53 can be defined by making the axis of rotation 37 (the support portion 39) penetrate along the inner circumferential surfaces of the tubes 36.

In any of the paths 64, the wall surfaces 52a, 52b, and 52c can be formed simply by processing portions exposed to the outside into the shape of depressions, and thus, the formation can be easily performed. In this case, various shapes, for example, semicircular, triangular, elliptical, and rectangular, can be applied as the shapes of the wall surfaces 52a, 52b, and 52c in the shape of depressions.

In addition, in the above-described one embodiment, the screw main body 20p is composed of the tubes 36 and the axis of rotation 37. However, the screw main body 20p may be composed of one straight axial member 20t as shown in FIG. 19 instead. In this case, the above-described conveyance portions and barrier portions are provided on the outer circumferential surface of the solid screw main body 20p, and the above-described paths 64 are provided inside the screw main body 20p. The figure shows, as an example, the paths 64 provided at positions eccentric to the axial line 41 and defined by tubular wall surfaces 52d, but do not limit the disposition of each of the paths 64.

Moreover, in the above-described one embodiment, the paths 64, both ends of which are completely closed, have been assumed. However, the paths 64, both ends of which are openable, may be applied instead. To the paths 64, the following formation method can be applied. That is, a path constituent portion which penetrates the screw main body 20p in the axial direction is formed in advance. Next, along the one continuous path constituent portion, blockages are inserted with a space therebetween to be extractable. The path constituent portion, both ends of which are openable by the adjacent blockages, is thereby formed. Then, the paths 64 according to the present modification can be formed by opening both sides of the path constituent portion in the outer circumferential surface 36s of the screw main body 20p.

In the above-described one embodiment, as the second extruder 3, a single screw extruder equipped with one extruder screw 20 has been assumed. However, the second extruder 3 may be a twin screw extruder equipped with two extruder screws 20 instead.

Incidentally, in the above-described one embodiment, FIG. 6 and FIG. 9 show the paths 64 in which both sides of the path main body 66 are connected to the entrance 65 and the exit 67 at positions shifted from the bottom portions 65a and 67a of the entrance 65 and the exit 67. However, the connection relationship between the path main body 66 and the entrance 65 and the exit 67 is not limited to that of the above-described one embodiment, and the following connection relationship is also included in the technical scope of the present invention.

FIG. 20 to FIG. 25 show, as examples, the path 64 in which both sides of the path main body 66 are connected to the bottom portions 65a and 67a of the entrance 65 and the exit 67. Specifically, one side of the path main body 66, that is, the above-described other end of the first portion 66a, is connected to the bottom portion 65a of the entrance 65. Moreover, the other side of the path main body 66, that is, the above-described other end of the second portion 66b, is connected to the bottom portion 67a of the exit 67.

Figures 20A, 20B:
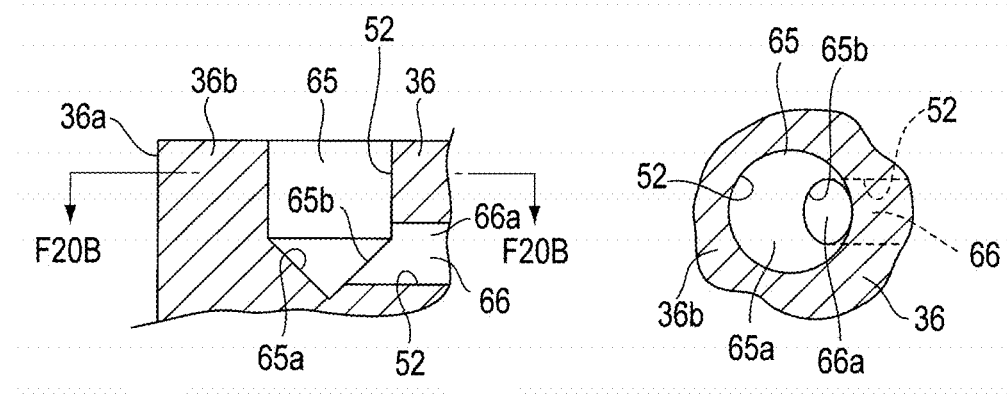
FIG. 20 (A) is an expanded sectional view showing a structure of an entrance portion of the path in a modification of the present invention.
Figures 21A, 21B:
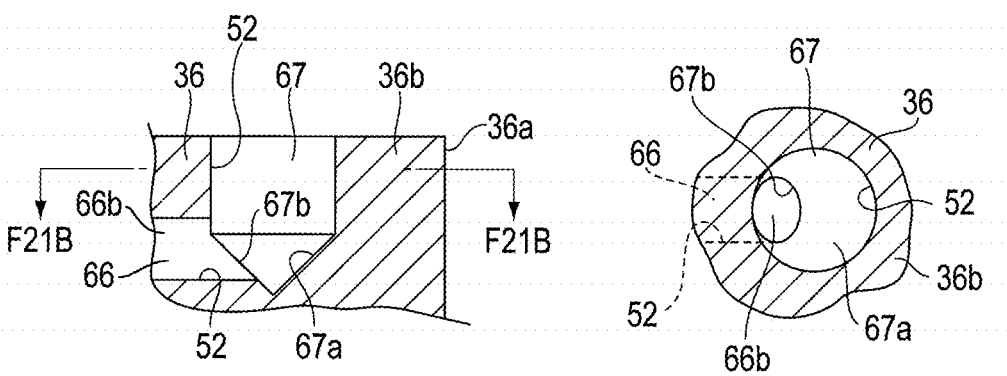
FIG. 21 (A) is an expanded sectional view showing a structure of an exit portion of the path in the modification of the present invention.

FIGS. 20 (A) and (B) and FIGS. 21 (A) and (B) show the path 64 according to a first modification. In the path 64, an end face on one side of the path main body 66 (the other end of the first portion 66a) is connected to the bottom portion 65a of the entrance 65. In the bottom portion 65a, one opening 65b communicating with the path main body 66 (the first portion 66a) is formed. On the other hand, an end face on the other side of the path main body 66 (the other end of the second portion 66b) is connected to the bottom portion 67a of the exit 67. In the bottom portion 67a, one opening 67b communicating with the path main body 66 (the second portion 66b) is formed.

The one opening 65b of the entrance 65 is formed in a region facing the bottom portion 65a having a shape widening toward the outer circumferential surface 36s of the screw main body 20p. On the other hand, the one opening 67b of the exit 67 is formed in a region facing the bottom portion 67a having a shape widening toward the outer circumferential surface 36s of the screw main body 20p.

In this case, raw materials which have flowed into the entrance 65 are guided toward the opening 65b along the inclination of the bottom portion 65a. As a result, the raw materials do not remain in the entrance 65, and all of them continuously and smoothly flows into the path main body 66. The raw materials which have passed through the path main body 66 then flow into the exit 67. The raw materials which have flowed into the exit 67 are guided toward the outer circumferential surface 36s of the screw main body 20p along the inclination of the bottom portion 67a. As a result, the raw materials do not remain in the exit 67, and all of them continuously and smoothly flows out toward the outer circumferential surface 36s of the screw main body 20p.

Accordingly, the raw materials can be prevented from locally remaining in the path 64 while extension action is continuously imparted to the raw materials passing through the path 64 thoroughly and uniformly.

Figures 22A, 22B:
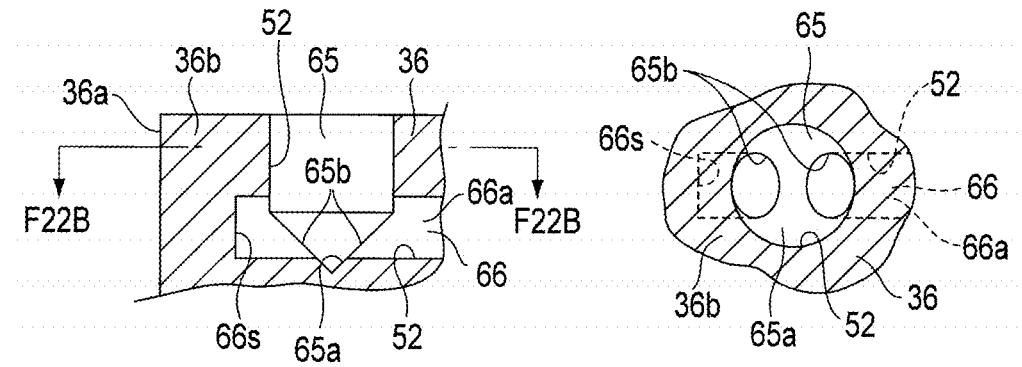
FIG. 22 (A) is an expanded sectional view showing the structure of the entrance portion of the path in a modification of the present invention.
Figures 23A, 23B:
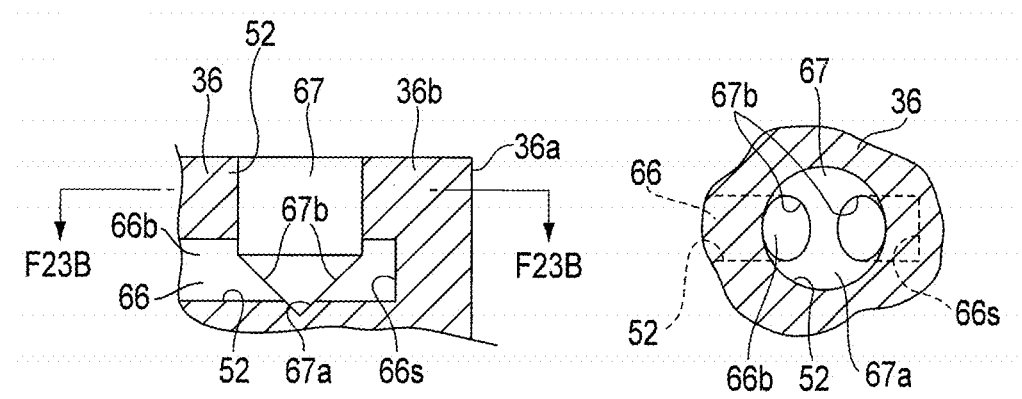
FIG. 23 (A) is an expanded sectional view showing the structure of the exit portion of the path in the modification of the present invention.

FIGS. 22 (A) and (B) and FIGS. 23 (A) and (B) show the path 64 according to a second modification. In the path 64, a portion closer to an end face 66s on one side of the path main body 66 (the other end of the first portion 66a), that is, a portion located short of the end face 66s, is connected to the bottom portion 65a of the entrance 65. In the bottom portion 65a, two openings 65b communicating with the path main body 66 (the first portion 66a) are formed. On the other hand, a portion closer to an end face 66s on the other side of the path main body 66 (the other end of the second portion 66b), that is, a portion located short of the end face 66s, is connected to the bottom portion 67a of the exit 67. In the bottom portion 67a, two openings 67b communicating with the path main body 66 (the second portion 66b) are formed.

The two openings 65b of the entrance 65 are formed in a region facing the bottom portion 65a having a shape widening toward the outer circumferential surface 36s of the screw main body 20p. On the other hand, the two openings 67b of the exit 67 are formed in a region facing the bottom portion 67a having a shape widening toward the outer circumferential surface 36s of the screw main body 20p. The operations and advantages of the path 64 according to the second modification are the same as those of the path 64 according to the above-described first modification, and thus, description thereof is omitted.

Figures 24A, 24B:
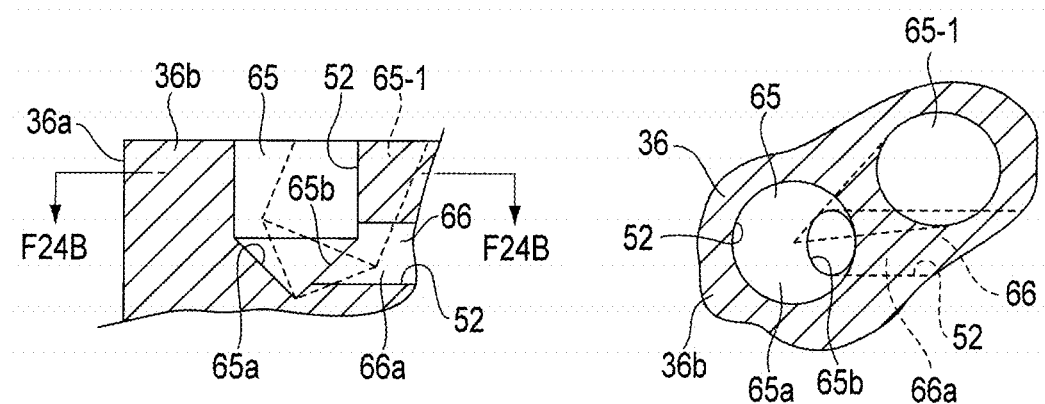
FIG. 24 (A) is an expanded sectional view showing the structure of the entrance portion of the path in a modification of the present invention.
Figures 25A, 25B:
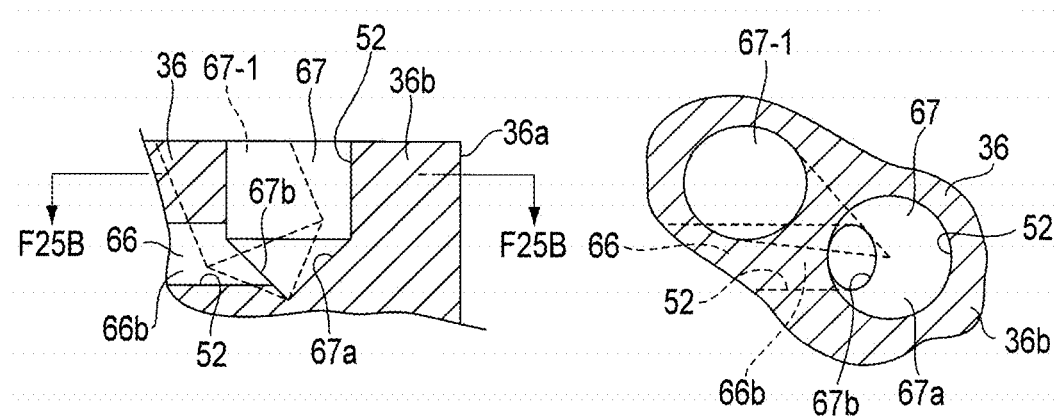
FIG. 25 (A) is an expanded sectional view showing the structure of the exit portion of the path in the modification of the present invention.

In the above-described one embodiment and modifications, it has been assumed that the opening directions of the entrance 65 and the exit 67 are orthogonal to the axial line 41. However, the opening directions are not limited to these. For example, as shown in FIGS. 24 (A) and (B) and FIGS. 25 (A) and (B), the opening directions of the entrance 65 and the exit 67 may be set to be directions crossing the axial line 41 (directions indicated by dotted lines). In this case, entrances 65 and 65-1 and exits 67 and 67-1 may be provided by opening both sides of the path main body in directions.

Moreover, the entrance 65 is preferably formed to be further recessed than the outer circumferential surface 36s of the screw main body 20p. This enables raw materials to more easily flow into the entrance 65.

Furthermore, in the above-described embodiment and modifications, the paths 64 each comprising the path main body 66 parallel to the axial line 41 have been assumed. However, the technical scope of the present invention is not limited to this, and also includes the paths 64 each comprising the path main body 66 crossing the axial line 41. For example, the other side of the path main body 66, the one side of which is connected to the entrance 65, is directly opened in the outer circumferential surface 36s of the screw main body 20p (the tubes 36) by eliminating the exit 67. In this case, the path main body 66 having an upward slope from the one side toward the other side is formed.

According to this structure, raw materials which have flowed into the path main body 66 from the entrance 65 are subjected to centrifugal action exerted when the screw main body 20p rotates, thereby flowing through the path main body 66 more smoothly and flowing out toward the outer circumferential surface 36s of the screw main body 20p (the tubes 36). At this time, extension action is more efficiently and continuously imparted to the raw materials. As a result, the degree of kneading of the raw materials can be further increased.

REFERENCE SIGNS LIST

20: Extruder screw
20p: Screw main body
36: Tube
37: Axis of rotation
38: Coupling portion
39: Support portion
40: Stopper portion
41: Axial line
42a, 42b, 42c: Conveyance portion
43: Barrier portion
44: Discharge conveyance portion
45a, 45b, 45c, 46: Flight
47: Gap
48: Barrier flight
64: Path
65: Entrance
66: Path main body
67: Exit

What is claimed is:

1. An extruder screw configured to convey a raw material while kneading the raw material, comprising:
a screw main body having a straight axial line in a conveyance direction of the raw material, and configured to rotate on the axial line;
conveyance portions provided in an axial direction of the screw main body, and configured to convey the raw material in the axial direction along an outer circumferential surface extending in a circumferential direction of the screw main body with rotation of the screw main body;
barrier portions provided on the screw main body, and configured to limit conveyance of the raw material at positions adjacent to the conveyance portions; and
paths provided inside the screw main body, in each of which the raw materials flows,
the conveyance portions and the barrier portions are alternately arranged along the axial direction of the screw main body,
the conveyance portions includes third conveyance portions adjacent to the respective barrier portions and second conveyance portions adjacent to the respective third conveyance portions, and
in the respective third conveyance portions, and a second conveyance portion and a barrier portion adjacent to respective sides of the respective third conveyance portion,
the paths each comprise an entrance opened on a side of the respective barrier portion, of the outer circumferential surface of the respective third conveyance portion to cause the raw material, the conveyance of which is limited by the barrier portions to increase pressure on the raw material, to flow in, an exit opened on a side of the respective second conveyance portion, of the outer circumferential surface of the respective third conveyance portion to allow the flowing raw material to flow out to the outer circumferential surface of the screw main body, and a path main body connecting between the entrance and the exit, and
the raw material flowing into the entrance flows towards the exit in an opposite direction to a conveyance direction of the conveyance portions.

2. The extruder screw of claim 1, wherein the screw main body extends in the axial direction from a basal end coupled to a rotating device to a tip,
each of the conveyance portions is provided with a flight spirally twisted along the outer circumferential surface of the screw main body, and
from a perspective of a basal end side, the flight is twisted from the basal end toward the tip of the screw main body in an opposite direction to a rotation direction of the screw main body.

3. The extruder screw of claim 2, wherein each of the barrier portions is provided with a barrier annular body continuing in the circumferential direction along the outer circumferential surface of the screw main body, and
the barrier annular body is formed to have a cylindrical surface concentrically continuing in the circumferential direction with the axial line as a center.

4. The extruder screw of claim 2, wherein each of the barrier portions is provided with a barrier flight spirally twisted along the outer circumferential surface of the screw main body, and
from the perspective of the basal end side, the barrier flight is twisted from the basal end toward the tip of the screw main body in a same direction as the rotation direction of the screw main body.

5. An extruder comprising the extruder screw of claim 2 and configured to knead the raw material with the screw and continuously produce and extrude the kneaded material, the extruder comprising:
a barrel comprising a cylinder in which the extruder screw is rotatably inserted;
a supply port through which the raw material is supplied to the cylinder, the supply port being provided in the barrel; and
a discharge port through which the kneaded material is extruded, the discharge port being provided in the barrel.

6. An extrusion method of kneading the raw material with the extruder screw of claim 2 and continuously producing and extruding the kneaded material, the extrusion method comprising:

conveying the raw material in the axial direction by the conveyance portions of the screw main body;

limiting the conveyance of the raw material by the barrier portions of the screw main body to increase the pressure on the raw material;

causing the raw material, the pressure on which is increased, to flow into the paths provided inside the screw main body and flow through the paths in the opposite direction to the conveyance direction of the conveyance portions; and returning the raw material flowing through the paths to the outer circumferential surface of the screw main body at the position on the upstream side in the conveyance direction in the conveyance portions in which the entrance is opened.

7. The extruder screw of claim 1, wherein the screw main body extends in the axial direction from a basal end coupled to a rotating device to a tip, each of the conveyance portions is provided with a flight spirally twisted along the outer circumferential surface of the screw main body, and from a perspective of a basal end side, the flight is twisted from the basal end toward the tip of the screw main body in a same direction as a rotation direction of the screw main body.

8. The extruder screw of claim 7, wherein each of the barrier portions is provided with a barrier annular body continuing in the circumferential direction along the outer circumferential surface of the screw main body, and the barrier annular body is formed to have a cylindrical surface concentrically continuing in the circumferential direction with the axial line as a center.

9. The extruder screw of claim 7, wherein each of the barrier portions is provided with a barrier flight spirally twisted along the outer circumferential surface of the screw main body, and from the perspective of the basal end side, the barrier flight is twisted from the basal end toward the tip of the screw main body in an opposite direction to the rotation direction of the screw main body.

10. An extruder comprising the extruder screw of claim 7 and configured to knead the raw material with the screw and continuously produce and extrude the kneaded material, the extruder comprising:

a barrel comprising a cylinder in which the extruder screw is rotatably inserted;

a supply port through which the raw material is supplied to the cylinder, the supply port being provided in the barrel; and a discharge port through which the kneaded material is extruded, the discharge port being provided in the barrel.

11. An extrusion method of kneading the raw material with the extruder screw of claim 7 and continuously producing and extruding the kneaded material, the extrusion method comprising:

conveying the raw material in the axial direction by the conveyance portions of the screw main body;

limiting the conveyance of the raw material by the barrier portions of the screw main body to increase the pressure on the raw material;

causing the raw material, the pressure on which is increased, to flow into the paths provided inside the screw main body and flow through the paths in the opposite direction to the conveyance direction of the conveyance portions; and returning the raw material flowing through the paths to the outer circumferential surface of the screw main body at the position on the upstream side in the conveyance direction in the conveyance portions in which the entrance is opened.

12. An extruder comprising the extruder screw of claim 1 and configured to knead the raw material with the screw and continuously produce and extrude the kneaded material, the extruder comprising:

a barrel comprising a cylinder in which the extruder screw is rotatably inserted;

a supply port through which the raw material is supplied to the cylinder, the supply port being provided in the barrel; and a discharge port through which the kneaded material is extruded, the discharge port being provided in the barrel.

13. An extrusion method of kneading the raw material with the extruder screw of claim 1 and continuously producing and extruding the kneaded material, the extrusion method comprising:

conveying the raw material in the axial direction by the conveyance portions of the screw main body;

limiting the conveyance of the raw material by the barrier portions of the screw main body to increase the pressure on the raw material;

causing the raw material, the pressure on which is increased, to flow into the paths provided inside the screw main body and flow through the paths in the opposite direction to the conveyance direction of the conveyance portions; and returning the raw material flowing through the paths to the outer circumferential surface of the screw main body at the position on the upstream side in the conveyance direction in the conveyance portions in which the entrance is opened.

14. An extruder screw configured to convey a raw material while kneading the raw material, the extruder screw comprising:

a screw main body having a straight axial line in a conveyance direction of the raw material, and configured to rotate on the axial line, and conveyance portions configured to convey the raw material, barrier portions configured to limit conveyance of the raw material, and a path through which the raw material flow is provided at places of the screw main body, wherein in at least one of the places,
the path is provided inside the screw main body,
the conveyance portions and the barrier portions are alternately arranged along the axial direction of the screw main body,
the conveyance portions includes third conveyance portions adjacent to the respective barrier portions and second conveyance portions adjacent to the respective third conveyance portions, and
in the respective third conveyance portions, and a second conveyance portion and a barrier portion adjacent to respective sides of the respective third conveyance portion,
the paths each comprise an entrance opened on a side of the respective barrier portion, of the outer circumferential surface of the respective third conveyance portion to cause the raw material, the conveyance of which is limited by the barrier portions to increase pressure on the raw material, to flow in, an exit opened on a side of the respective second conveyance portion, of the outer circumferential surface of the respective third conveyance portion to allow the flowing raw material to flow out to the outer circumferential surface of the screw main body, and a path main body connecting between the entrance and the exit, and the raw material flowing into the entrance flows towards the exit in an opposite direction to a conveyance direction of the conveyance portions.

* * * * *